United States Patent [19]
Miller et al.

[11] Patent Number: 5,917,175
[45] Date of Patent: Jun. 29, 1999

[54] MODULAR HAND-HELD DATA ENTRY SYSTEM WITH VOICE INTERFACE

[75] Inventors: Phillip Miller; William T. Gibbs; Robert G. Geers; Ronald L. Mahany; George E. Hanson; Arvin D. Danielson; Darald R. Schultz; Keith K. Cargin; Steven E. Koenck; Dennis A. Durbin; Darrell L. Boatwright, all of Cedar Rapids; Stephen J. Kelly, Marion, all of Iowa

[73] Assignee: Norand Corporation, Cedar Rapids, Iowa

[21] Appl. No.: 08/685,254

[22] Filed: Jul. 23, 1996

Related U.S. Application Data

[62] Continuation of application No. 08/444,619, May 19, 1995, Pat. No. 5,539,194, which is a continuation of application No. 08/251,844, May 31, 1994, Pat. No. 5,539,193, which is a continuation-in-part of application No. 07/777,393, filed as application No. PCT/US90/03282, Jun. 7, 1990, Pat. No. 5,410,141, which is a continuation-in-part of application No. 07/364,902, Jun. 8, 1989, abandoned, and a continuation-in-part of application No. 07/364,594, Jun. 7, 1989, abandoned, and a continuation-in-part of application No. 07/866,642, Apr. 3, 1992, abandoned, and a continuation-in-part of application No. 07/816,888, Jan. 3, 1992, abandoned, which is a continuation-in-part of application No. 07/809,380, Dec. 18, 1991, abandoned, and a continuation-in-part of application No. 07/633,500, Dec. 26, 1990, Pat. No. 5,202,817, which is a continuation-in-part of application No. 07/626,711, Dec. 12, 1990, abandoned, application No. 07/364,594, Jun. 7, 1989, abandoned, and application No. 07/364,902, Jun. 8, 1989, abandoned.

[51] Int. Cl.[6] .................................................. G06K 7/10
[52] U.S. Cl. ............................................ 235/472; 235/383
[58] Field of Search ....................................... 235/383, 472

[56] References Cited

U.S. PATENT DOCUMENTS

| | | | |
|---|---|---|---|
| 4,415,065 | 11/1983 | Sandstedt | 235/383 |
| 4,569,421 | 2/1986 | Sandstedt | 235/383 |
| 4,604,065 | 8/1986 | Frazer et al. | 235/472 |
| 4,831,610 | 5/1989 | Hoda et al. | 235/472 |
| 4,838,791 | 6/1989 | Bogosian et al. | 235/472 |
| 4,877,949 | 10/1989 | Danielson | 235/462 |
| 5,126,543 | 6/1992 | Berceron | 235/472 |
| 5,277,614 | 1/1994 | Danielson | 235/472 |
| 5,410,141 | 4/1995 | Koenck | 235/472 |
| 5,574,804 | 11/1996 | Olschafskie | 235/472 |

FOREIGN PATENT DOCUMENTS

WO90/16033  12/1990  WIPO .

*Primary Examiner*—Harold Pitts
*Attorney, Agent, or Firm*—Stanford & Bennett, L.L.P

[57] ABSTRACT

A hand held data entry apparatus having a body for receiving, storing and transmitting information, including a camming mechanism for quickly sealingly attaching an accessory such as a scanner to the top of a hand held data entry apparatus. Additionally, a similar camming mechanism is utilized to hold a battery pack in place with the additional feature of not only pulling the battery pack securely against the housing, but also pushing the battery pack contacts into abutment with complementary contacts disposed within the housing. A keypad is provided for permitting information to be manually entered into the hand held body and this keypad is encased in a layer of elastomeric material such as silicone. A pair of LED's are utilized, one to indicate a "good scan" and the other to indicate something else, such as a "bad scan." Additionally, these LED's can be encased in operative or dummy keys in order to save keyboard space. A mechanism is provided for pivoting the scanner about either of two perpendicular axes.

22 Claims, 54 Drawing Sheets

MODULAR HAND-HELD DATA ENTRY SYSTEM WITH VOICE INTERFACE

CROSS REFERENCE TO RELATED APPLICATIONS (Claiming Benefit Under 35 U.S.C. 120)

This application is a continuation-in-part of application Ser. No. 07/866,642, filed Apr. 3, 1992 by D. Schultz et al, now abandoned. Said application Ser. No. 07/866,642 is in turn a continuation-in-part of the following:

(1) Application Ser. No. 07/816,888, filed Jan. 3, 1992 by D. Schultz et al now abandoned, which is in turn a continuation-in-part of application Ser. No. 07/809,380, filed Dec. 18, 1991 by D. Schultz et al now abandoned; and (2) Application Ser. No. 07/633,500, filed Dec. 26, 1990 by S. Koenck et al, U.S. Pat. No. 5,202,817 which is in turn a continuation-in-part of application Ser. No. 07/626,711, filed Dec. 12, 1990, now abandoned, application Ser. No. 07/364,594, filed Jun. 7, 1989 by K. Cargin et al, now abandoned, and application Ser. No. 07/364,902, filed Jun. 8, 1989 by A. Danielson et al, now abandoned.

This application is a continuation of application Ser. No. 08/444,619 filed May 19, 1995 now U.S. Pat. No. 5,539,194 which is a continuation of application Ser. No. 08/251,844 filed May 31, 1994, now U.S. Pat. No. 5,539,193 which is a continuation-in-part of application Ser. No. 07/777,393, filed Jan. 7, 1992, now U.S. Pat. No. 5,410,141, issued Apr. 25, 1995, which in turn is the U.S.A. national phase of International Application No. PCT/US90/03282 with an international filing date of Jun. 7, 1990; said International Application No. PCT/US90/03282 is a continuation-in-part of said application Ser. No. 07/364,902, filed Jun. 8, 1989 now abandoned, and said application Ser. No. 07/364,594, filed Jun. 7, 1989 now abandoned.

INCORPORATION BY REFERENCE

The above referred to related applications, together with PCT Application PCT/US90/03282, filed Jun. 7, 1990 and PCT Application PCT/US91/09421, filed Dec. 12, 1991 are incorporated herein by reference in their entirety, and hereby are made a part of this application.

TECHNICAL FIELD

The present invention relates generally to a hand held data entry terminal, and more particularly to such a terminal which is modular and which has unique mechanisms for attaching or disconnecting modules such as a battery pack or a scanner to the body of such device.

BACKGROUND ART

Hand held data entry terminals are available to collect data, to selectively process data and to communicate collective data with other systems by various automated or manual operations. A typical automated process, which may be included in such operations, relates to collecting data by scanning bar code data with a scanner. Subsequently, the collective data information may be processed such as becoming included in a data base. In another operation, it may be desired to communicate the information to another unit within a respective data collection system.

Various investigatory efforts in this area have shown that some functional applications of the data collection systems may require certain features on such hand-held units which may not at all be required in other functional applications. Going toward specialization of the units for specific tasks, the cost of operating the data collection systems tends to become more and more prohibitive as systems become configured to accommodate various specific applications. On the other hand, when data entry units are mass produced for general applications, efficiency in the application is jeopardized and compromise on various features results in less than the most efficient data handling procedures. It is consequently desirable to provide a data collection system in which hand-held units are equipped with features relating to particular needs without having a prohibitively high price tag.

The desirability of using interchangeable modules in a hand held data entry terminal is illustrated in U.S. patent application Ser. No. 07/633,500, filed Dec. 26, 1990, and U.S. patent application Ser. No. 07/816,888, filed Jan. 3, 1992, both of which are incorporated herein by reference. For example, in addition to having a scanner which can connect to a data entry terminal, other modules can be substituted for such scanners, such as an RF link.

Since these accessories must be sealed to the body housing and secured from moving with respect to the second body housing, prior art systems have been somewhat cumbersome and not altogether reliable.

Another problem associated with hand held data entry terminals is replacement of a battery pack and making sure that the battery pack makes a reliable contact with the contacts within the hand held unit itself.

Because these hand held data entry terminals are often used outside and in wet and inclement weather, it is necessary that it be sealed sufficiently to prevent the entry of moisture therein. The attempts to seal these units on the keyboard portion have not been completely satisfactory and the sealing of an accessory module such as a scanner has been even more of a problem.

Another problem associated with a hand held data entry apparatus is being able to position a scanner attached thereto in such a manner that it is flexible enough to accommodate all users and most working situations. Heretofore, a hand held unit has not been available to permit scan left, right or straight ahead (all three options) while viewing a display on such hand held unit. Also, pivoting the built in scanner or bar code reader about two perpendicular axes has not been considered as a way to provide desired adjustability.

Another problem has been that the audio signal, signaling the situation that the scan has been acceptable, is not always heard because of other noises in the area. Consequently, there is a need for both an audio and visual indication of a "good scan" situation and furthermore, there is a need for a visual indication of a "bad scan." Because the size of the keyboard of a hand held unit must be kept to a minimum, there is quite often not enough space to put all such features available on such keyboard.

DISCLOSURE OF THE INVENTION

The present invention relates generally to a hand held data entry apparatus having a body for receiving, storing and transmitting information, including a camming mechanism for quickly, sealingly attaching an accessory such as a scanner to the top of a hand held data entry apparatus. Additionally, a similar camming mechanism is utilized to hold a battery pack in place with the additional feature of not only pulling the battery pack securely against the housing, but also pushing the battery pack contacts into abutment with complementary contacts disposed within the housing.

A keypad is provided for permitting information to be manually entered into the hand held body and this keypad is encased in a layer of elastomeric material such as silicone. A pair of LED's are utilized, one to indicate a "good scan" and the other to indicate something else, for example a "bad scan." Additionally, these LED's can be encased in operative or dummy keys in order to save keyboard space.

A built in bar code reader is pivotally attached about two perpendicular axis for adjusting the reader for convenience to the user.

An object of the present invention is to provide a mechanism for quickly and dependably securing an accessory such as a scanner to a hand held data terminal.

Another object of the present invention is to securely and dependably attach a battery pack to a hand held data terminal in such a way that the battery pack makes good electrical contact with the hand held data terminal.

Another object of the present invention is to provide a hand held data terminal which is substantially moisture resistant.

A still further object of the present invention is to provide a hand held data terminal which has at least a pair of visual LED indicators to indicate the currents of certain events such as a "good scan," a "bad scan," an indication of a low battery condition, an indication of information from a host computer, and an indication of error in the manual entry of data or anyone of a number of other user programmable events.

A still further object of the present invention is to permit compactness of the keyboard by putting an LED indicator light within keys of the keyboard of a hand held computer data terminal.

A still further object is to provide a bar code reader scanner pivotable about the longitudinal axis of the terminal.

A still further object of the invention is to provide a scanner pivotable about two perpendicular axis with respect to the terminal.

Other objects, advantages, and novel features of the present invention will become apparent from the following detailed description of the invention when considered in conjunction with the accompanying drawings.

BEST MODE FOR CARRYING OUT THE INVENTION

Description of FIGS. 1–22

Figure 1:
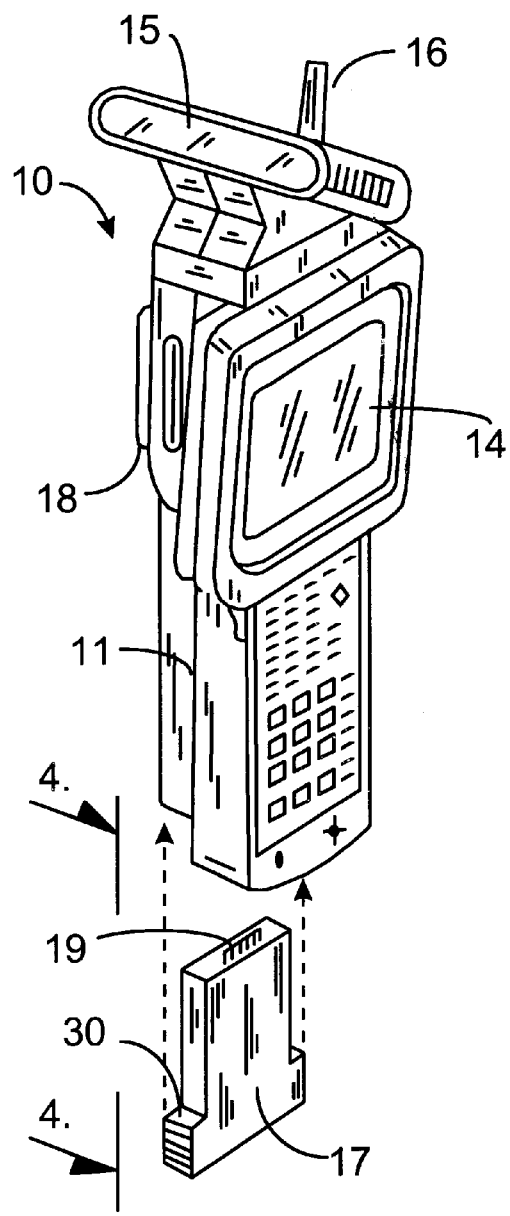
FIG. 1 is a perspective view of a preferred embodiment of the present invention showing a hand held data entry terminal having a keyboard for the entry of manual information, a display, a scanner, a battery pack and an RF link.

Referring now to the drawings wherein like reference numerals designate identical or corresponding parts throughout the several views, FIG. 1 shows a hand held data entry terminal (10) constructed in accordance with the present invention and having a body (11). A keyboard (12) has an overlay (13) disposed thereon and a display (14) is provided for displaying whatever is manually entered through the keyboard (12) or what is scanned in through scanner (15). The scanner (15) also has an RF link (16) attached thereto.

Battery pack (17) fits in the bottom of the body (11) for providing power to the terminal (10). Side button (18) is provided for shifting the definition of certain keys on the keyboard to another definition by merely using the hand holding the housing (11). The battery pack (17) has a plurality of metal contacts (19) thereon for engaging a plurality of contacts (20) inside the housing (11) as is shown in dashed lines in FIG. 2.

Figure 2:
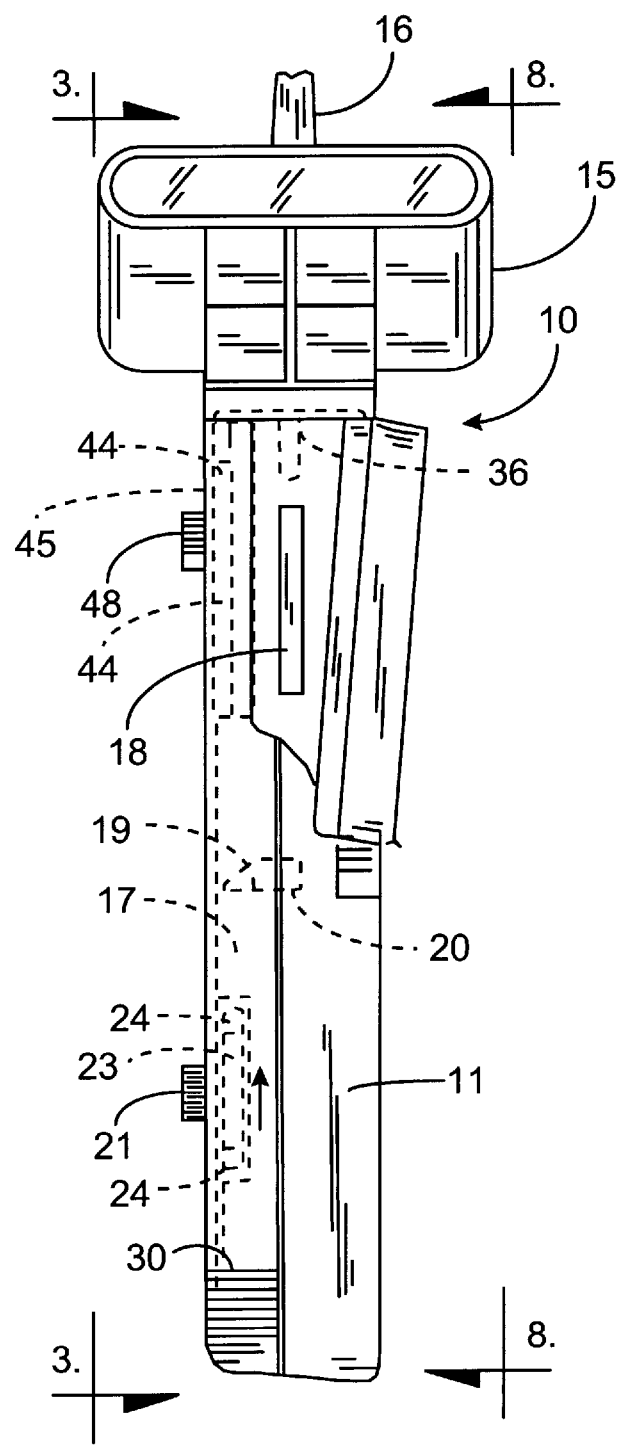
FIG. 2 is a side elevational view of the terminal shown in FIG. 1.
Figure 3:
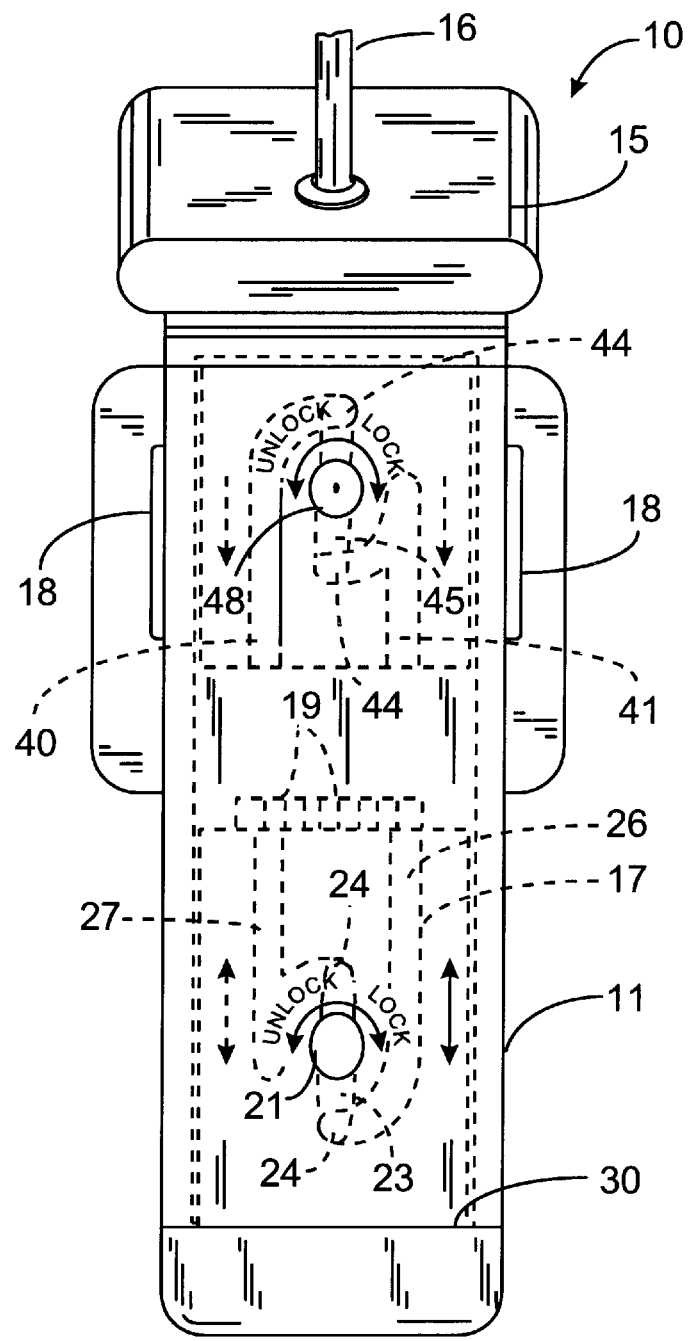
FIG. 3 is a rear view of the terminal shown in FIG. 1.
Figure 4:
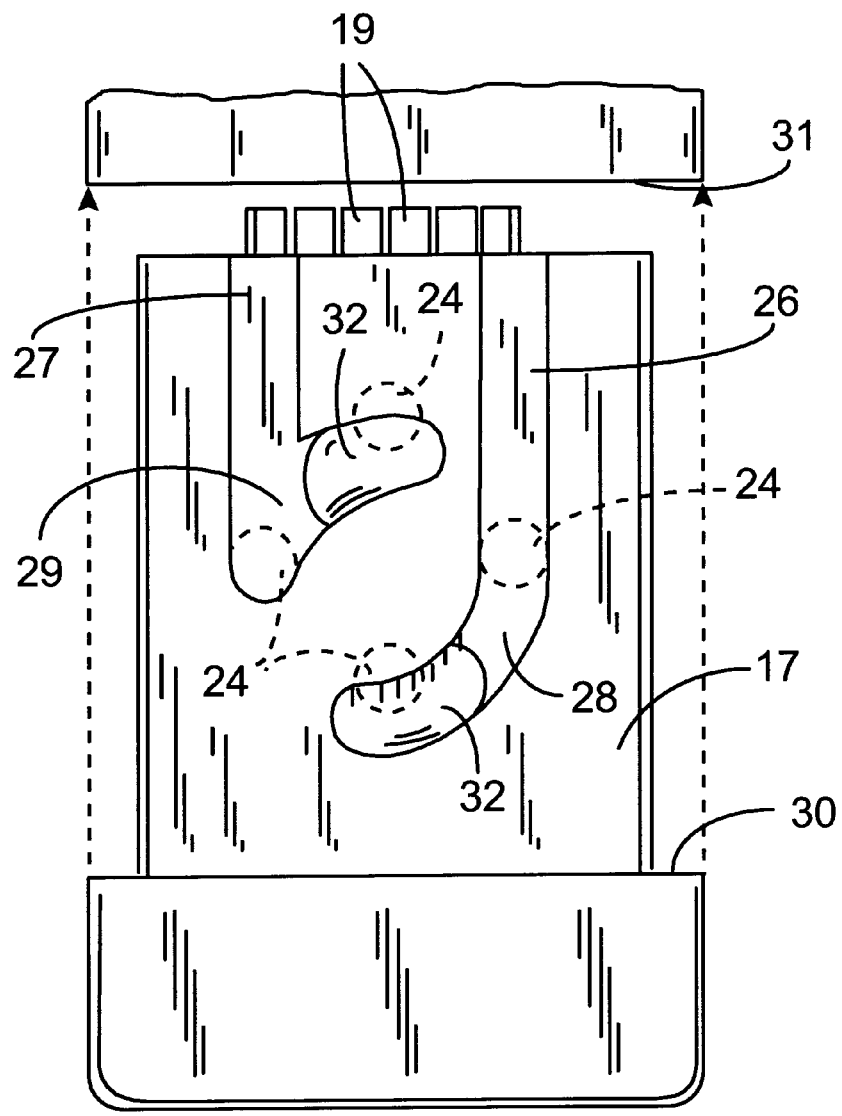
FIG. 4 is an enlarged view of the battery pack taken along line 4—4 of FIG. 1.
Figure 5:
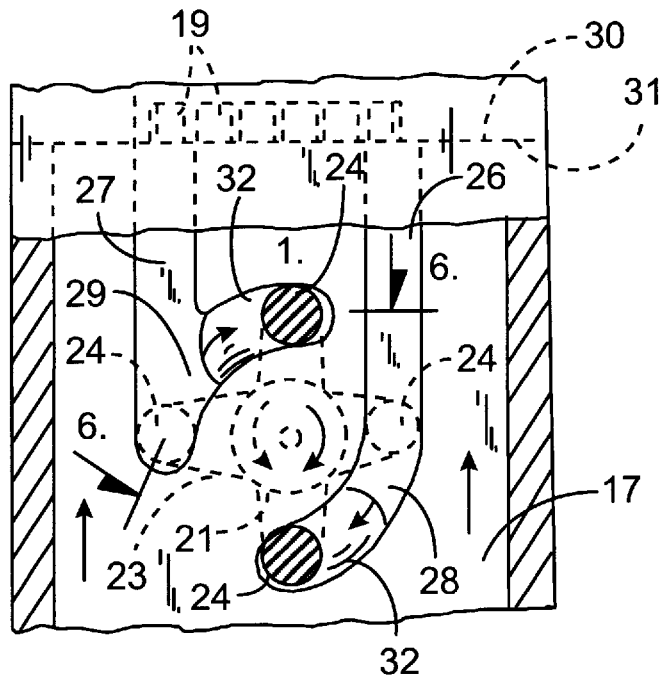
FIG. 5 shows the battery pack installed in the body and showing in solid lines how the cams lock the battery pack in place and in dashed lines where the cam followers are before they are pivoted to the solid line position.
Figure 6:
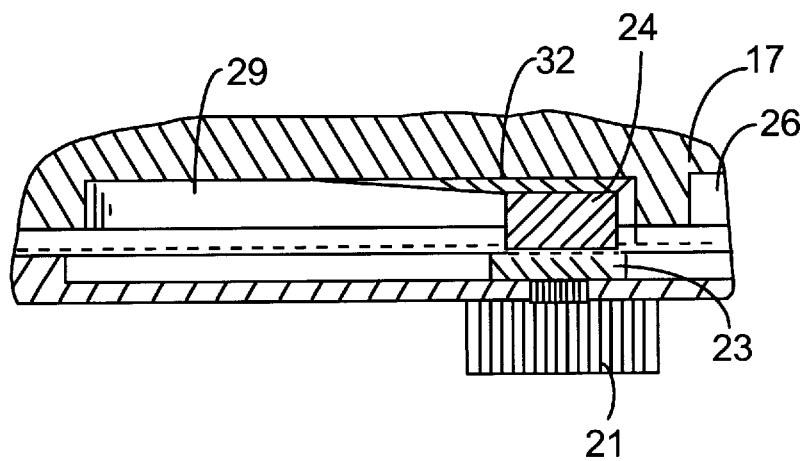
FIG. 6 is an enlarged cross sectional view taken along line 6—6 of FIG. 5.
Figure 7:
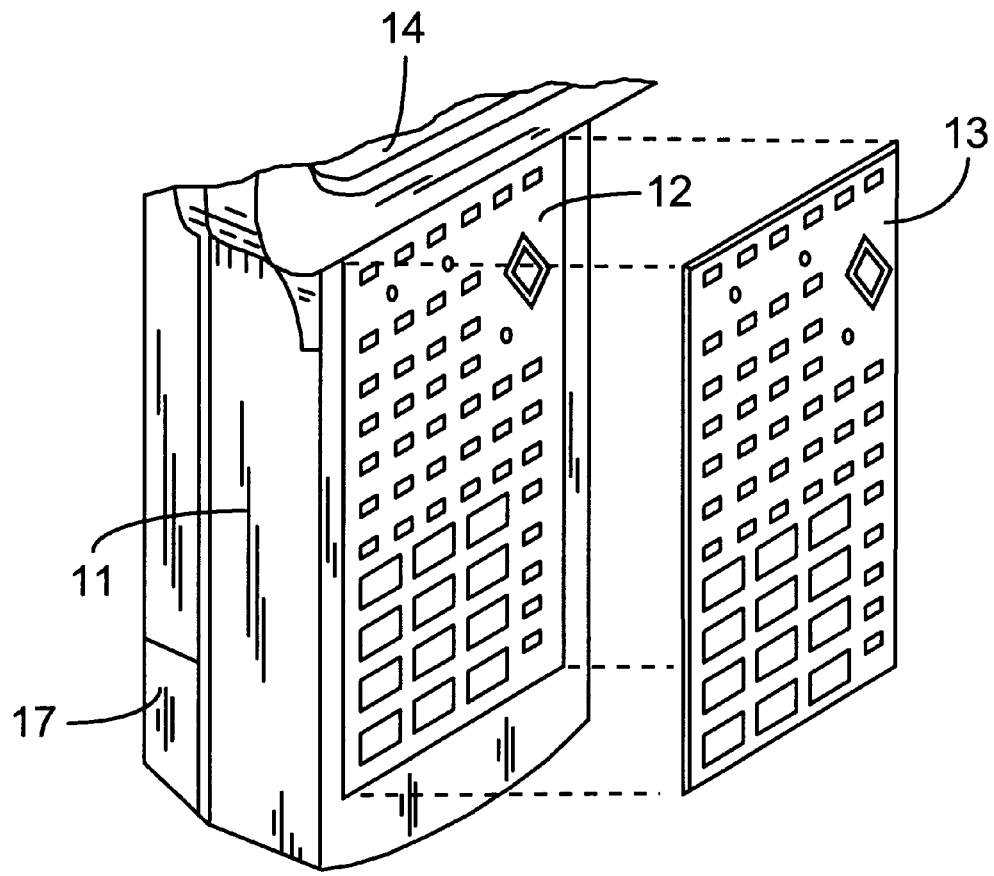
FIG. 7 is an exploded view of the keypad showing an overlay for providing written information to the user.
Figure 8:
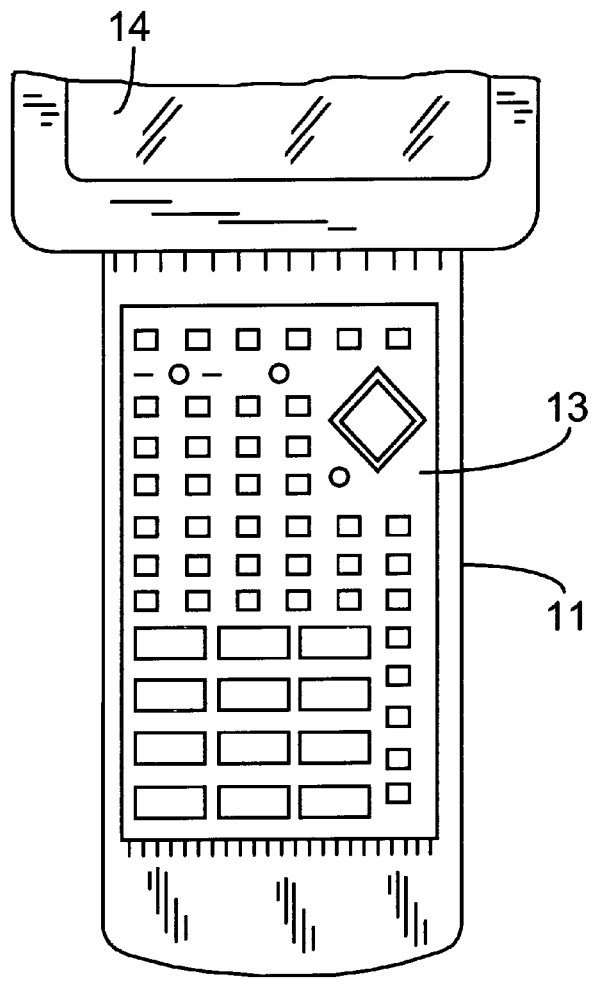
FIG. 8 is a front view of the device of FIG. 7 with the overlay attached.

In order to secure the battery pack (17) into the housing (11) in the position shown in FIGS. 2 and 3, the knob (21) is utilized to position member (23) and cams (24) to the position shown in dashed lines in FIG. 5. In that position, the battery pack (17) can be slid into the housing (11) and the cam followers (24) will slide along the straight portion (26) and (27) of the slots therein. After the battery pack (17) is moved to the position shown in FIG. 5, the knob (21) is rotated so that the cam followers (24) move in curved slot portions (28) and (29). This will have the effect of pulling the battery pack (17) in the direction of the arrow shown in FIG. 17 to pull the shoulder (30) of battery pack (17) against shoulder (31) of the housing (11). Additionally, because of the extra cam piece (32) disposed within each of the grooves (28) and (29), the cam follower (24) will push on the battery pack (17) to cause it to move in the direction shown in the arrow in FIG. 6, which will force the contacts (19) securely against the contacts (20) within the housing (11) as shown in FIG. 2 in dashed lines.

Referring now to FIGS. 11–17, it is noted that the scanner (15) is rotatably attached to a member (35) by a post (36) extending through an opening (37) in member (35) whereupon a pin (not shown) extends through a hole (38) to prevent the post (36) from pulling back up through the hole (37) in member (35). A flange (39) is rigidly connected to the member (35) and has grooves with straight portions (40) and (41) and curved portions (42) and (43) respectively.

Cams (44) are rigidly connected to a member (45), which turns in the same direction as knob (48) is turned and to the same degree that knob (48) is turned in one direction or the other. These cams (44) are initially moved to the open position shown in dashed lines in FIG. 13 so that the straight portions (40) and (41) of flange (39) will receive these cam followers (44) so that the flange (39) can be moved to the position shown in FIG. 13. By turning the knob (48) in a clockwise direction, the cam followers (44) will move to the position shown in FIG. 13, thereby pulling the flange (39) in the direction shown by the arrows in FIG. 13 such that an O-ring seal (46) is pulled down against the shoulder (47) at the top of the housing (11) to securely seal the member (35) against the housing (11).

Figure 14:
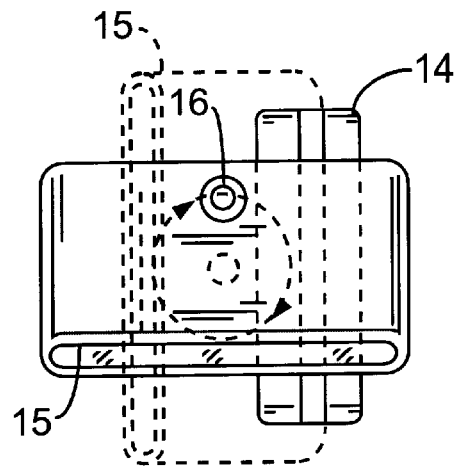
FIG. 14 is a view showing the scanner pivoted to the left when a person is viewing the display and is a top plan view.
Figure 15:
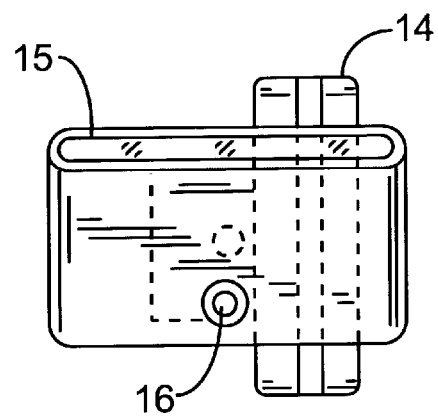
FIG. 15 is a top view showing the scanner facing to the right as a user is viewing the display.
Figure 16:
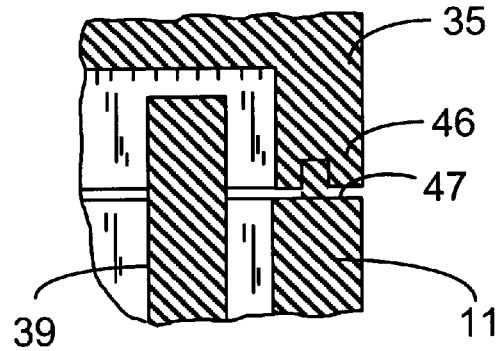
FIG. 16 is an enlarged partial cross sectional view taken along line 16—16 and showing how the connecting structure seals the scanner to the body of the terminal by use of an O-ring.
Figure 17:
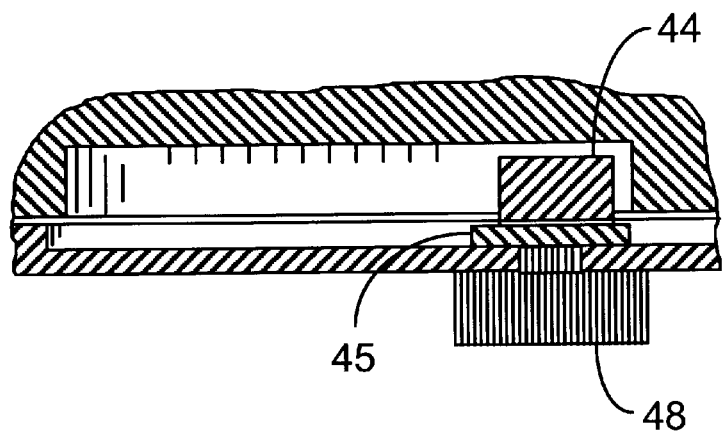
FIG. 17 is an enlarged partial view taken along line 17—17 of FIG. 13 showing the camming slots and cam follower.
Figure 18:
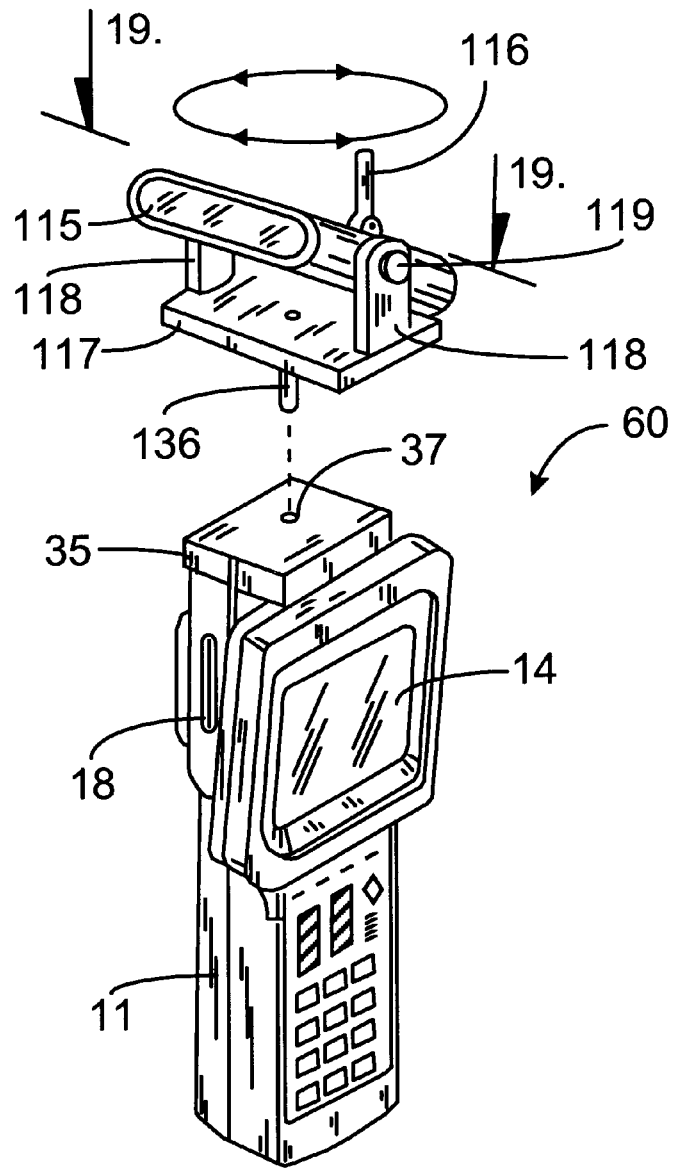
FIG. 18 is an exploded perspective view of another embodiment of the present invention showing a scanner or bar code reader which is pivotable about an axis perpendicular to the longitudinal axis about which the scanner is also rotatable.
Figure 19:
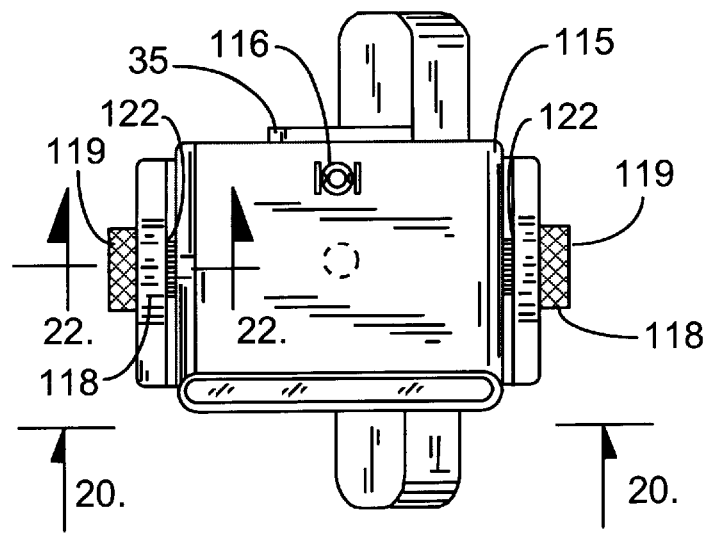
FIG. 19 is a view taken along line 19—19 of FIG. 18.
Figure 20:
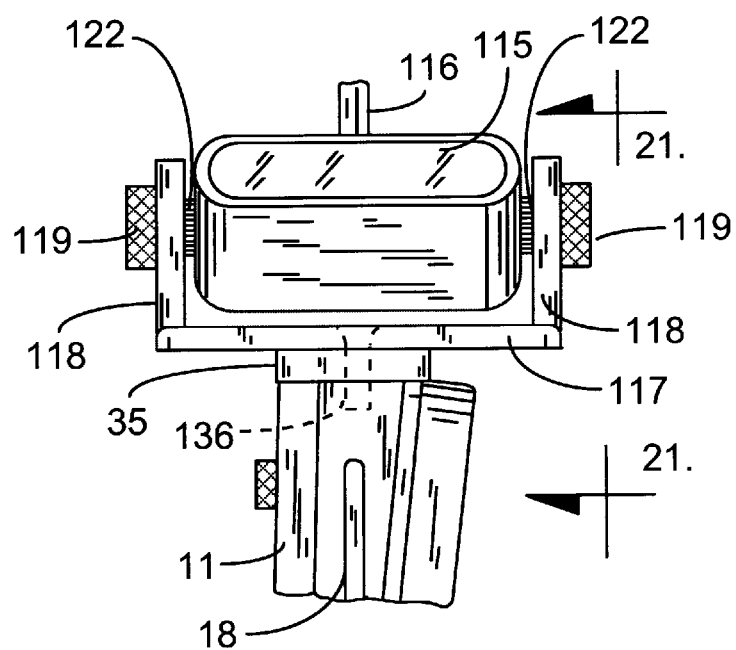
FIG. 20 is an enlarged view taken along line 20—20 of FIG. 19.
Figure 21:
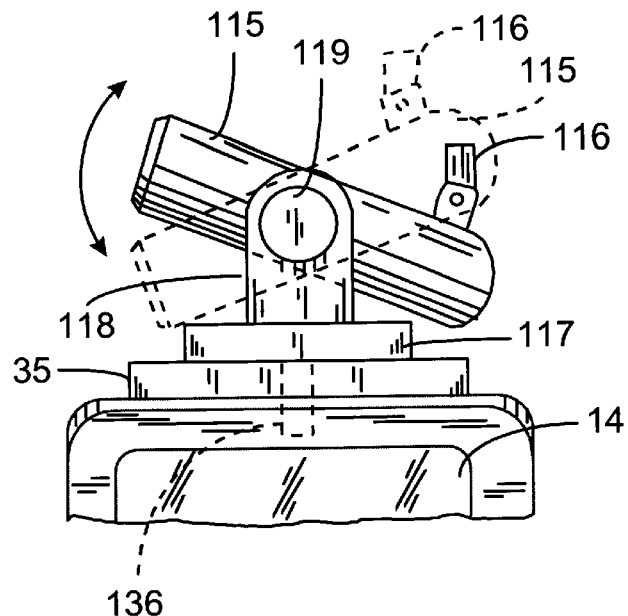
FIG. 21 is an enlarged view taken along line 21—21 of FIG. 20 showing how the scanner can be adjusted about a horizontal axis.
Figure 22:
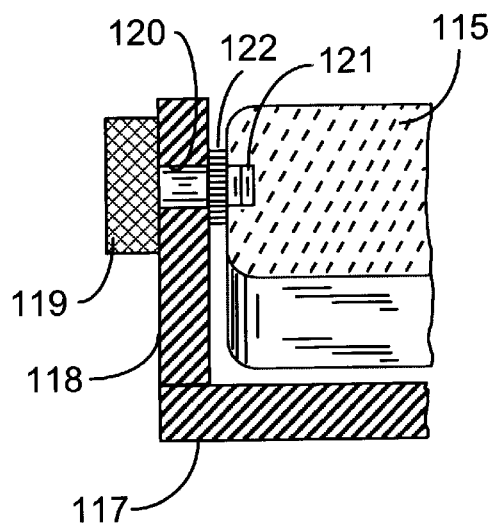
FIG. 22 is an enlarged cross sectional view taken along line 22—22 of FIG. 19 showing how set screws at the sides of the scanner can be used to permit pivoting of the scanner and at the same time can be used as a locking mechanism to hold the scanner in place after it is adjusted about a horizontal axis.

Because the scanner (15) is pivotable about the post (36), and member (35), it can be moved to the left as shown in FIG. 14 and the scanning function can occur while the user is holding the device and looking at the display (14). Similarly, the user can move the scanner (15) to the right while viewing the display (14), or alternatively, the user can orient the scanner (15) to the position wherein it points generally in the direction that the user is looking when looking at the display (14). The is permits the user to view the display while at the same time scanning information into the terminal.

Figure 10:
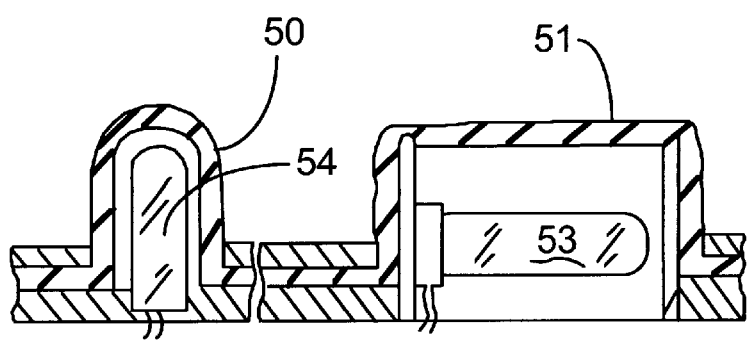
FIG. 10 is an enlarged partial cross sectional view taken along 10—10 of FIG. 9.
Figure 11:
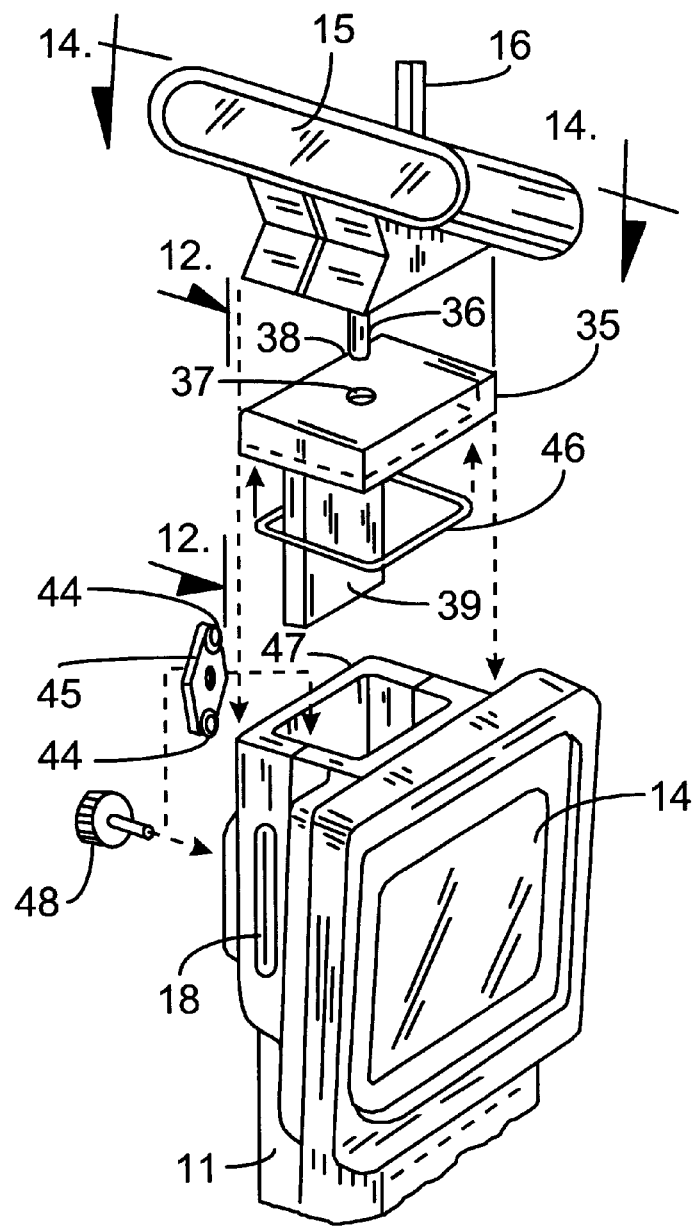
FIG. 11 is an exploded view showing how the scanner is attached in a modular fashion to the top of the terminal with the cam locking mechanism and also showing the structure being impossible to pivot the scanner 180°.
Figure 12:
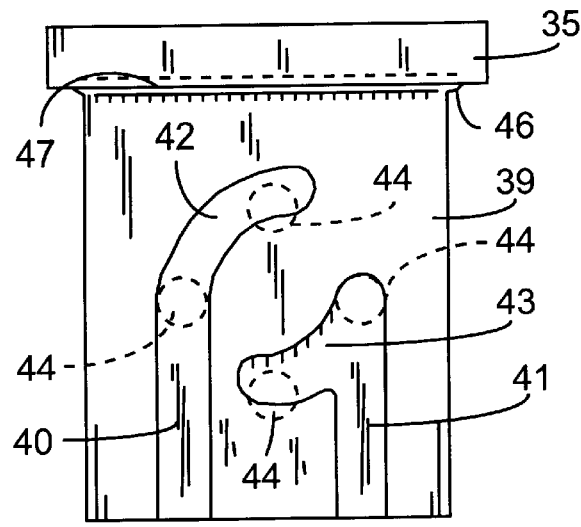
FIG. 12 is a view of a portion of the structure shown in FIG. 11 taken along line 12—12 of FIG. 11.
Figure 13:
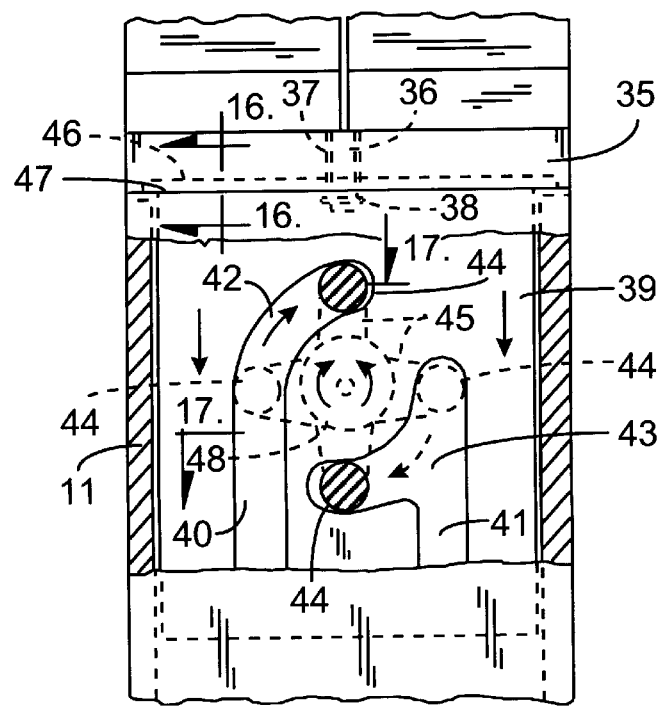
FIG. 13 shows a broken away view of the scanner attached to the terminal and showing the cam followers in solid lines in the attached position and in dashed lines in the position just prior to rotation of the cam followers.

FIG. 10 shows how the entire keyboard (12) is encased in an elastomeric silicone-like substance (50) which covers all of the keys including, a green key (51) for indicating a good scan and a yellow translucent key (52) for indicating a bad scan or the like. The elastomeric material (50) is translucent and permits light from an LED (53) to shine therethrough. Similarly, a separate pair of LED's (54) can extend through elastomeric portions (55) and (56). Ideally, the LED's (53) and (54) are mounted on the PC board keypad and the silicone elastomer is molded over the keys and over the LED's.

Figure 9:
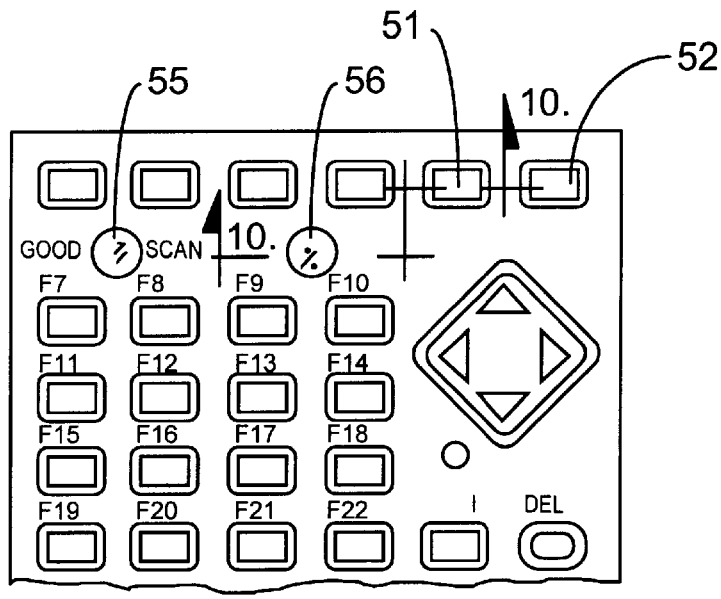
FIG. 9 is an enlarged partial view of the top portion of the overlay attached to the hand held data entry terminal.

The overlay (13), as can be seen in FIG. 9, has the words "good scan" beside it to indicate when the scan has been adequate and such condition would light the LED (54) in addition to the typical audio indication of a good scan. The other light indicating source (56) is user programmable and is also typically supplemental to an audible signal or it can replace an audible signal, if desired. This other visual indicator (56) can flash with each proper keystroke for manual entry of material into the terminal (10), it can flash to indicate a low battery condition, it can glow to indicate that information from a host computer is being received, it can indicate an error in the manual entry of data, it can merely indicate a scan which is bad or unacceptable, etc., depending upon the function programmed into the terminal (10).

Referring to FIGS. 18–22, a terminal (60) is shown. The terminal (60) is just like the terminal (10) shown in FIG. 1 from member (35) down and the portions numbered in the 100 series constitutes the different part of the terminal (60). Specifically, a CCD reader or laser scanner (115) is pivotally attached to member (117) by upstanding flanges (118). These flanges (118) (referring to FIG. 22) are rigidly attached to the member (117) and have openings therein for receiving set screws (119). These set screws (119) rotate freely within opening (120) of flange (118) and have threads (121) on the end thereof which are threadably received into the body of scanner (115). A washer (122) is provided between each flange (118) and the scanner body (115) for reasons which will be explained below.

Shaft (136) fits into the opening (137) of member (35) and can be pinned in placed as explained above with respect to the FIG. 1 embodiment. This permits the entire scanner unit (115) and member (117) to pivot about the axis of shaft (136) and consequently about the horizontal axis of the terminal body (11) as explained above and for the reasons given above with respect to the terminal (10). Additionally, the scanner (115) will pivot about the axis of set screws (119) and be movable generally between the positions shown in solid lines in FIG. 21 and the position shown in dashed lines in FIG. 21. It has been determined that some users prefer to hold the terminal in a different scanning position than others and that particular circumstances may dictate that a pivoted position between the two positions shown in FIG. 1 may be ideally suited for one circumstance while another pivoted position may be ideal for still another circumstance.

The set screws (119) are loosened in order to permit the scanner (115) to pivot freely about the axis of the set screws (119) and once the scanner is pivoted to the position desired, the set screws (119) are tightened, thereby pulling the scanner (115) against the washers (122) thereby frictionally preventing the scanner (115) from pivoting with respect to the flanges (118).

Of course when it is desired to re-adjust the scanner, a reverse process is used wherein the set screws (119) are loosened, the scanner or bar code reader (115) pivoted to the desired position and the set screws again tightened to hold it in the desired position.

Description of FIGS. 23–43:

In accordance with the present invention, a selected one of a plurality of special purpose functional modules may be attached to another module of one of a selected second functional configurations to configure a plurality of different modules of different specific functional features. Thus, according to one aspect of the invention, with a reasonable number of functional modules a great number of differently configured modules may be provided.

A hand-held data collection terminal unit includes an elongate housing having a lower portion supportable in the hand of a user and an upper portion facing such user when the terminal is in a typical use position. The upper portion includes a keyboard and a display screen. In accordance with the invention, the hand-held terminal comprises a plurality of modules in which a base module extends longitudinally and includes inner and outer end caps of the terminal. The inner end cap is disposed on the end of the terminal which typically points toward a user when the terminal is in use, the outer end cap being disposed on opposite end of the terminal. A keyboard module is defined as an intermediate module disposed adjacent the base module and between the end caps. A display screen module is further disposed adjacent the intermediate module and adjacent the outer end cap of the base module.

According to a more particular aspect of the invention, the display screen module extends from the outer end cap at the base module longitudinally toward an end intermediate of the inner and outer end caps, such that a portion of the keyboard module remains exposed and features an array of manual input keys arranged in an area between the display screen module and the inner end cap.

According to another aspect of the invention, a data collection terminal unit includes a base module, a keyboard module disposed ad adjacent the base module and substantially of the same length and width as the base module. A display screen module is disposed adjacent the keyboard module and is disposed over at least one key arrangement of the keyboard unit. The display screen module is slidably arranged to be selectively slidable outward away from a user and from such at least one key arrangement to expose such keys for user access when the terminal unit is being placed into use.

According to yet another aspect of the invention, it is desired to protect the modular hand-held units from damage when the units are accidentally dropped. Resilient end caps and a layered, resilient interface extending peripherally beyond substantial module portions impart shock absorbing qualities to the modular hand-held units.

According to a further aspect of the invention, a scanner module is attached as an end cap module to an outer end of a modular hand-held terminal unit. The scanner module includes a scanner head which is rotatable about a longitudinal axis of the modular hand-held terminal unit and selectively adjustable to one of a plurality of user positions in which the scanner may conveniently be used to collect data from, for example, bar code labels while a display screen on a display screen module remains in view of the user of the terminal unit.

In further describing the various features and advantages of the invention and of particular hand-held terminal units including and embodying features of the invention, the following spacial relations are being followed. Directional indications refer to a normal position of use of a hand-held data collection terminal. In such position, the user would hold the terminal or terminal unit such that a display screen faces "up" into the direction of view of the user. Similarly, a keyboard would normally face up to e visible and manually accessible to a user. Correspondingly, the upper face of a data collection terminal unit is also referred to as a frontal side or face. The opposite side or portion of the unit is referred to as the rear or bottom portion of the unit and the direction in which the rear portion faces is the "lower, bottom or down" direction, or term of similar import. Also of interest are the descriptors at opposite ends of a longitudinal axis through a terminal unit. With the keyboard and display screen facing up, the longitudinal end of the terminal unit typically facing away from the user will be referred to and denoted as an "outer" end, while an opposite end of the unit directed toward the user when the unit is in a general position as described, is referred to as an "inner" end. These references should be kept in mind when reading the following detailed description.

Figure 23:
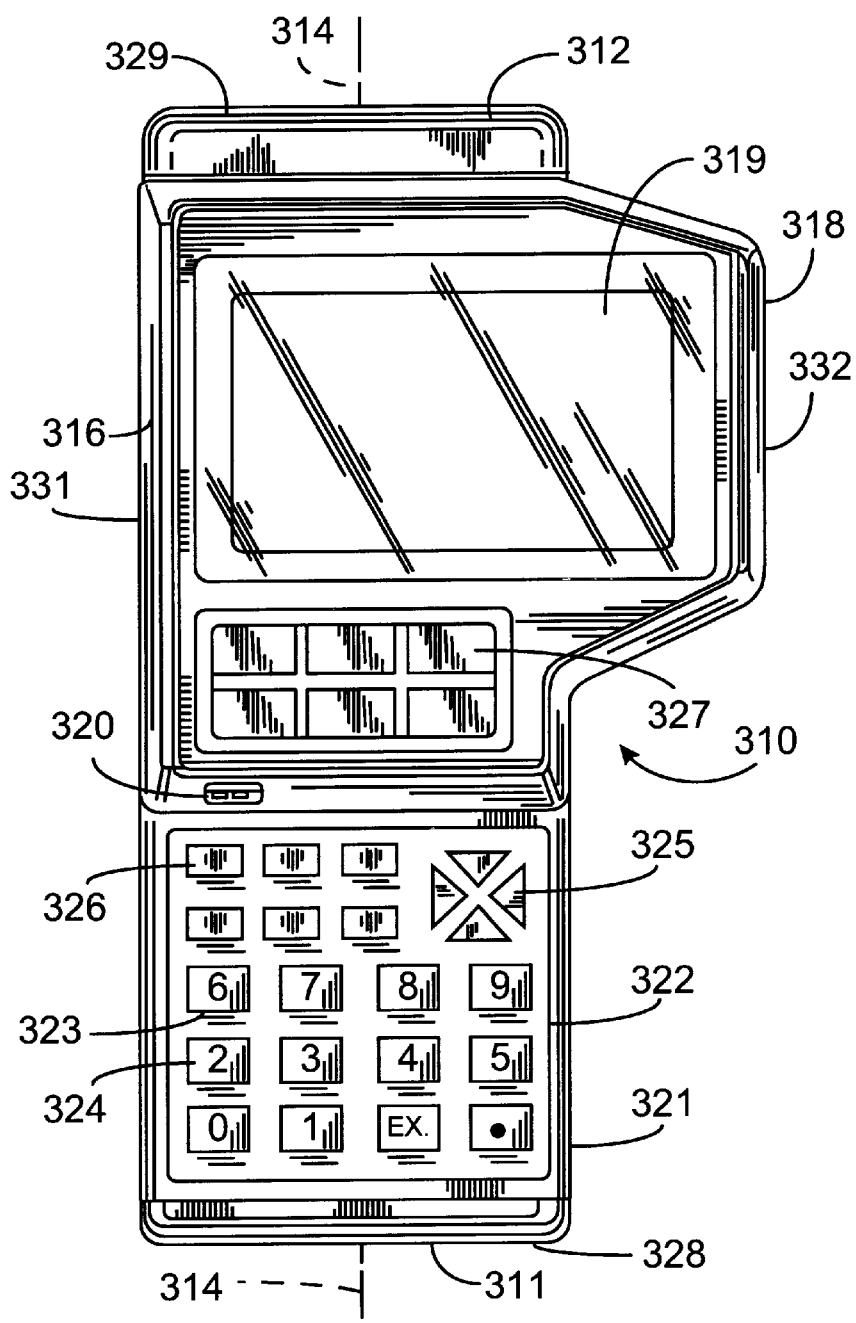
FIG. 23 shows a frontal view of a modular data collection terminal unit having a display screen module which is enlarged to one side of a generally elongated shape of the terminal unit.

Referring to the various illustrations in sequence, a data collection terminal unit which is designated generally in FIG. 23 by the numeral (310), is shown as undergoing various changes and modifications as selected different modules may be substituted for other modules and functions and capabilities of the data collection terminal unit (310) are correspondingly altered.

In reference to FIG. 23, there is shown a frontal view of the data collection terminal unit (310). In furtherance of advantages and objects of the invention, the data collection terminal unit (310) is a modular unit in that a plurality of modules become attached to each other to form the terminal unit (310). A general shape of the terminal unit (310) is an elongate rectangular shape as can be ascertained from the drawing. The terminal unit has an inner end (311) which typically is closest to a person using the terminal unit (310) when the terminal unit is in a typical hand-held operating position in which a user exposes a keyboard and a display screen toward the line of sight. Opposite the inner end (311) an outer end (312) of the data collection terminal unit is directed away from a user when the terminal unit (310) is hand-held in a typical use position. The general shape of the terminal unit is that of an elongated rectangle, such that a hypothetical longitudinal centerline or central axis indicated at (314) can be envisioned to extend in the longitudinal inward-outward direction of the terminal unit (310). The frontal view shows a display screen module (316) which is enlarged to one side of the terminal unit (310). A lateral extension (318) of the display screen module is in the preferred embodiment shown to extend toward the right hand side of the central axis (314) beyond the generally elongate rectangular shape of the terminal unit (310). The direction may be one of convenience to a user. The lateral extension, whether toward the left or right of the longitudinal axis (314) extends the line width of the viewing area of a display screen (319) of the module (316). Such extension (318) is desired to permit an alphanumeric instruction to be contained within a single character line of display for example. The display screen module (316) further may include a main power switch (320), in that in various configurations of the terminal unit (310) a display screen module or its equivalent would be included. Below the display screen module (316), and inwardly disposed, lies a keyboard module (321). The keyboard module (321) includes a particular keyboard (322) which may typically include an arrangement (323) of numerical keys (324). The numerical keys (324) are desirably supplemented by a cluster of cursor keys (325) and by selected function keys (326). The display screen module (316) may also include a cluster of further function switches (327). It should be understood that the modules (316) and (324) are mechanically attached to and part of the terminal unit (310) and are further electrically interconnected, such as may conveniently be achieved by typical flat cables and respective connectors, not shown. It is therefore convenient to provide cursor movement keys, such as the keys (325) as part of the keyboard, in that it is typically intended for the terminal unit (310) to feature a display screen module.

Further in accordance with the invention, the terminal unit (310), the unit-being typically hand-held, is subject to accidentally being dropped. To protect the terminal unit (310) from damages when dropped and established height, resilient end caps (328) and (329) cover the inner end outer ends (311) and (312), respectively. In addition, it has been found desirable to protect lateral ends of the display screen module (316) similarly with resilient strips (331) and (332).

Figure 24:
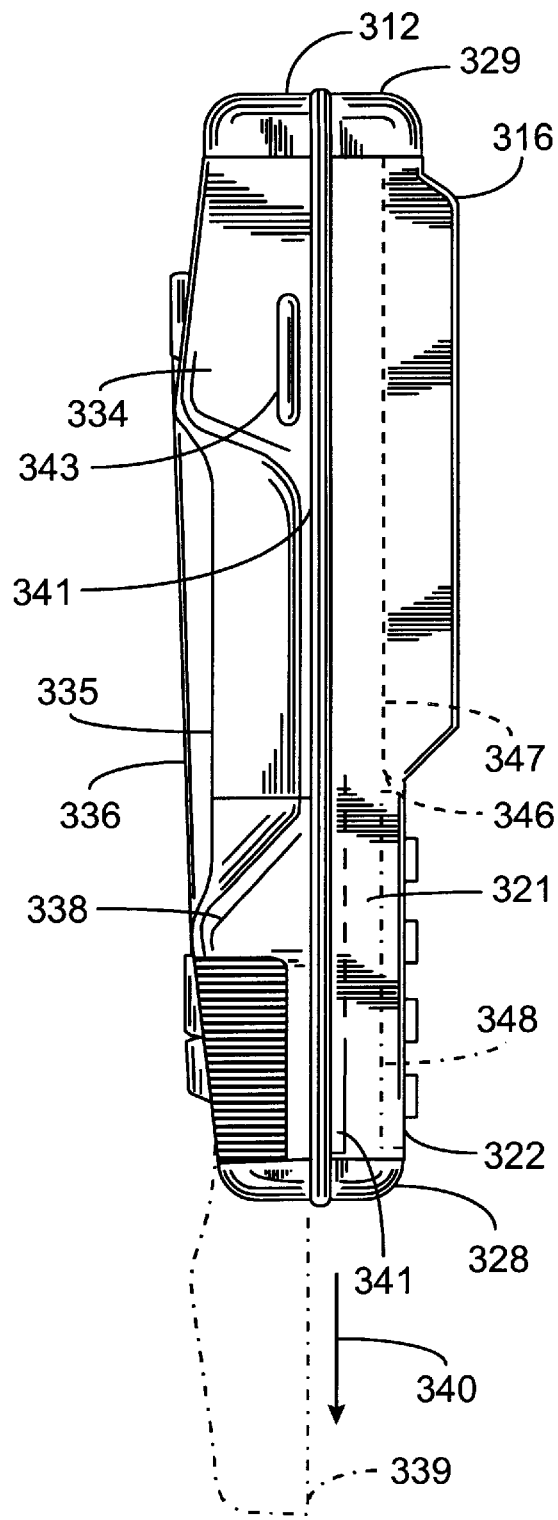
FIG. 24 is a side view of the data collection terminal unit shown in FIG. 23.

FIG. 24 is a side view of the data collection terminal unit (310). The side view of the terminal unit (310) further illustrates the modular construction of the terminal unit (310). A base module (334) desirably includes a central handgrip portion (335) and may further include a resilient strap (336), such that a user may insert the hand between the handgrip portion (335) and may further include a resilient strap (336), such that a user may insert the hand between the handgrip portion (335) and the resilient strap. A battery compartment (338) is shown at the lower, inner end of the base module (334). In that the terminal unit is a hand-held unit, an internally disposed electrical power source such as a battery module (339) is virtually required for desired operation of the terminal unit. In one configuration, the battery compartment comprises an opening into which the battery module (339) is inserted. The external shape of the battery module conforms to the shape of the base module to form part of it. The battery module (339) is desirably replaceable in a field exchange operation and may be removed by sliding the module (339) in the direction of the arrow (340). To secure the battery module within the base module (334), a locking mechanism which may be opened and closed by a coin, for example, is found to facilitate such replacement. A peripheral resilient strip or spacer (341) preferably overlies the base module (334) and functions as a shock absorber when the terminal unit (310) is accidentally dropped on its die surfaces. Adjacent the outer end of the handgrip portion (335) is disposed a function key (343). The function key (343) may be a data entry initiation key or a scanner operation control key when the terminal unit is equipped with a scanner module. It should be noted, that the function key (343) is disposed for persons holding the terminal unit in their right hand, such that the index finger of the user's right hand may be used to operate the key (343). The base unit may be furnished with a similar key (343), not shown, on the opposite side of the base module (334) to allow a person holding the unit with the left hand to operate such key. The respective keys would be electrically coupled to function in parallel, such that the desired function can be initiated from either side of the terminal unit (310). Disposed between the resilient end caps (328) and (329) and adjacent the resilient spacer (341) is the keyboard module (321). The keyboard module (321) functions consequently as a mounting base for the display screen module (316). A recess or step (346) in the upward facing surface (347) of the keyboard module (321) seats the display screen module (316). The display screen module (316) is preferably attached by typical screw type fasteners through the keyboard module (321). The keyboard module (321) in turn may be fastened in a similar manner from the bottom surface of the base module (334). In accordance with the invention, the keyboard module (321) further comprises a recess (348) for receiving one of a number of differently configured versions of the keyboard (322). The selected keyboard (322) is also attached through the body of the keyboard module (321) with respective fasteners, such as screws, for example.

Figure 25:
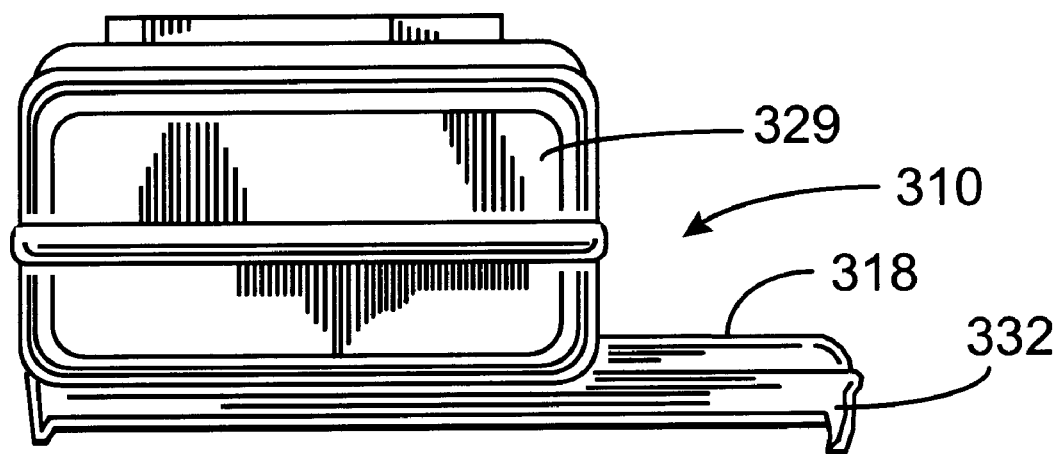
FIG. 25 is an outer end view of the data collection terminal unit shown in FIG. 23.

FIG. 25 is an outer end view of the data collection terminal unit (310). The need for the referred to resilient protective strip (332) may be realized in viewing lateral extending portion (318) of the display screen module (316).

Figure 26:
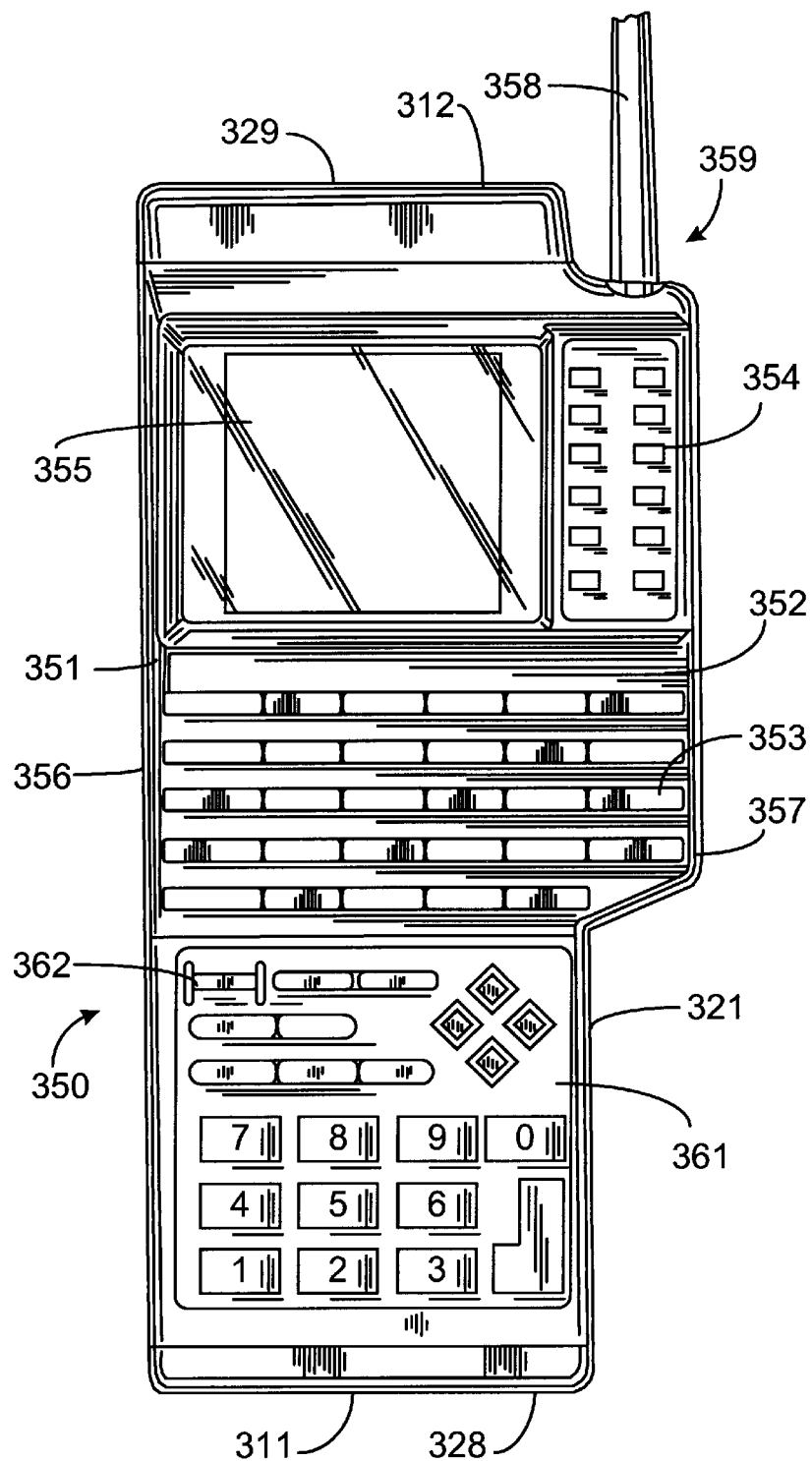
FIG. 26 is a frontal view of an alternate embodiment of a data collection terminal unit such as shown in FIG. 23, the alternate embodiment showing additional features including an RF communications capability as indicated by an antenna extending laterally of the longitudinal body of the data collection terminal unit.

FIG. 26 is a frontal view of a data collection terminal unit (350) which is an alternate embodiment of the terminal unit (310). In particular, the terminal unit (350) comprises a display screen module (351) including an arrangement (352) of alphabetical keys (353). The display screen module (351) further includes an arrangement of function keys (354) disposed vertically along a display screen (355). To accommodate the key arrangement (352), the display screen module (351) is also laterally extended as the display screen module (316). Consequently, lateral resilient strips (356) and (357) are preferred to increase the drop resistance of the terminal unit (350) as previously discussed with respect to the terminal unit (310). Because of the area occupied by the keys (352) and the function keys (354), the display screen does not extend beyond the lateral sides of the generally elongate shape other than the extended display screen display module (351). The terminal unit (350) further shows an outwardly extending antenna (358) as part of and evidencing a radio frequency communication system (359) being part of the terminal unit (350). As described with respect to the terminal unit (310), the terminal unit (350) also includes the resilient end caps (328) and (329). A keyboard (361) may be functionally different than the previously described keyboard (322), though it may be fitted into the aforementioned recess (348) of the keyboard module (321). In particular, the keyboard (361) shows a main power switch (362), rather than having such switch associated with the display screen module (351). As can be ascertained from the terminal unit (350), modules such as the keyboard module (321) may be interchangeably used with one of a number of display screen modules, such as the modules (316) and (351).

Figure 27:
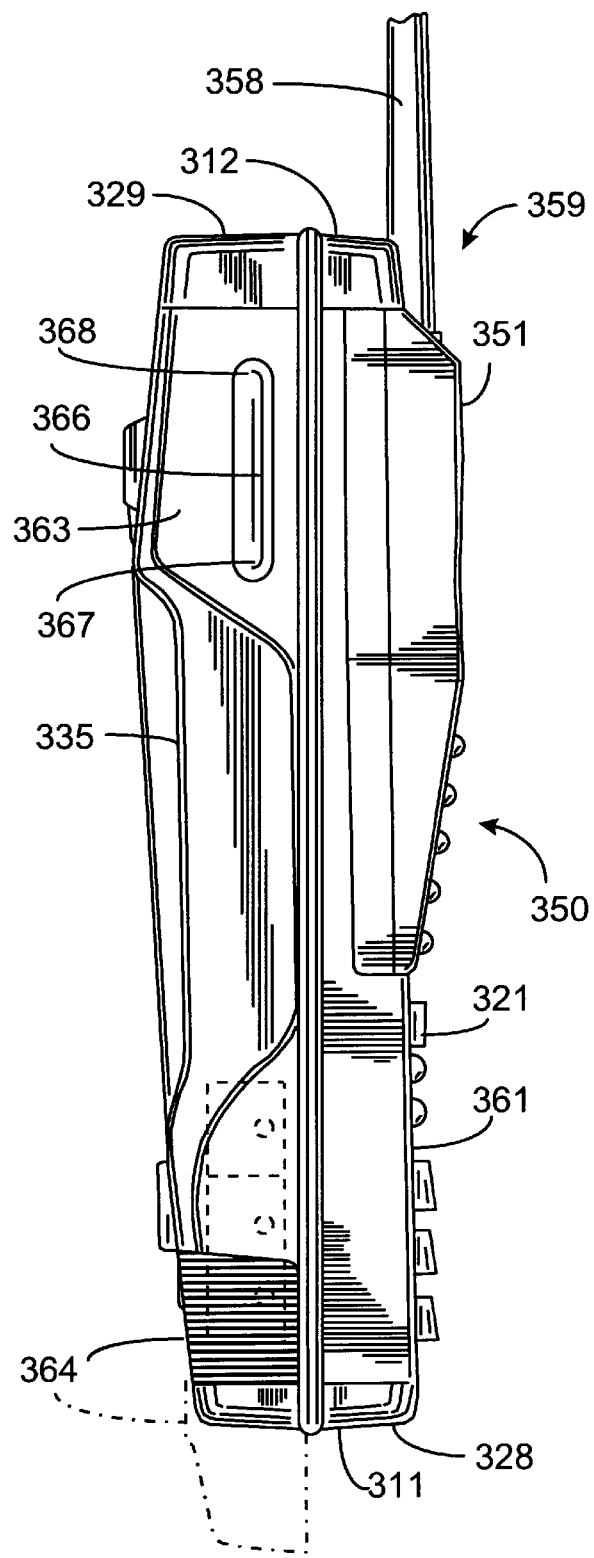
FIG. 27 is a side view of the data collection terminal unit shown in FIG. 26.

FIG. 27 is a side view of the data collection terminal unit (350). A base module (363) may in outer dimensions be the same as the base module (334) described with respect to FIG. 24. One difference may be noted in the configuration of a battery module (364) with respect to the configuration of the battery module (339). The battery module (364) shows less external surface and is inserted for a substantial portion into the base module (363). The centra hand grip portion (335) of the base module is in essence identical in both base modules. Another notable difference relates to a laterally disposed outer function key (366) which preferably may include more than one function, such as an enter function and scan function. The function key may be operated to enter data and to operate a scanning module when such a scanning module is provided. To operate the enter function, an inner end (367) of the function key (366) is depressed. To operate the scanning function an outer end (368) may be depressed. The respective, inner and outer locations are assigned because of a preferred addition of a scanner module in lieu of the outer end cap (329). As described with respect to the function key (348), the function key may be provided on either or both sides of the respective base modules. When the function keys are not provided, they may be deleted and replaced by a plug (not shown) which would be installed in lieu of the function switch. Also to be observed is the one for one placement of the display screen module (351) for the previously described display screen module 16 into the keyboard module (321).

Figure 28:
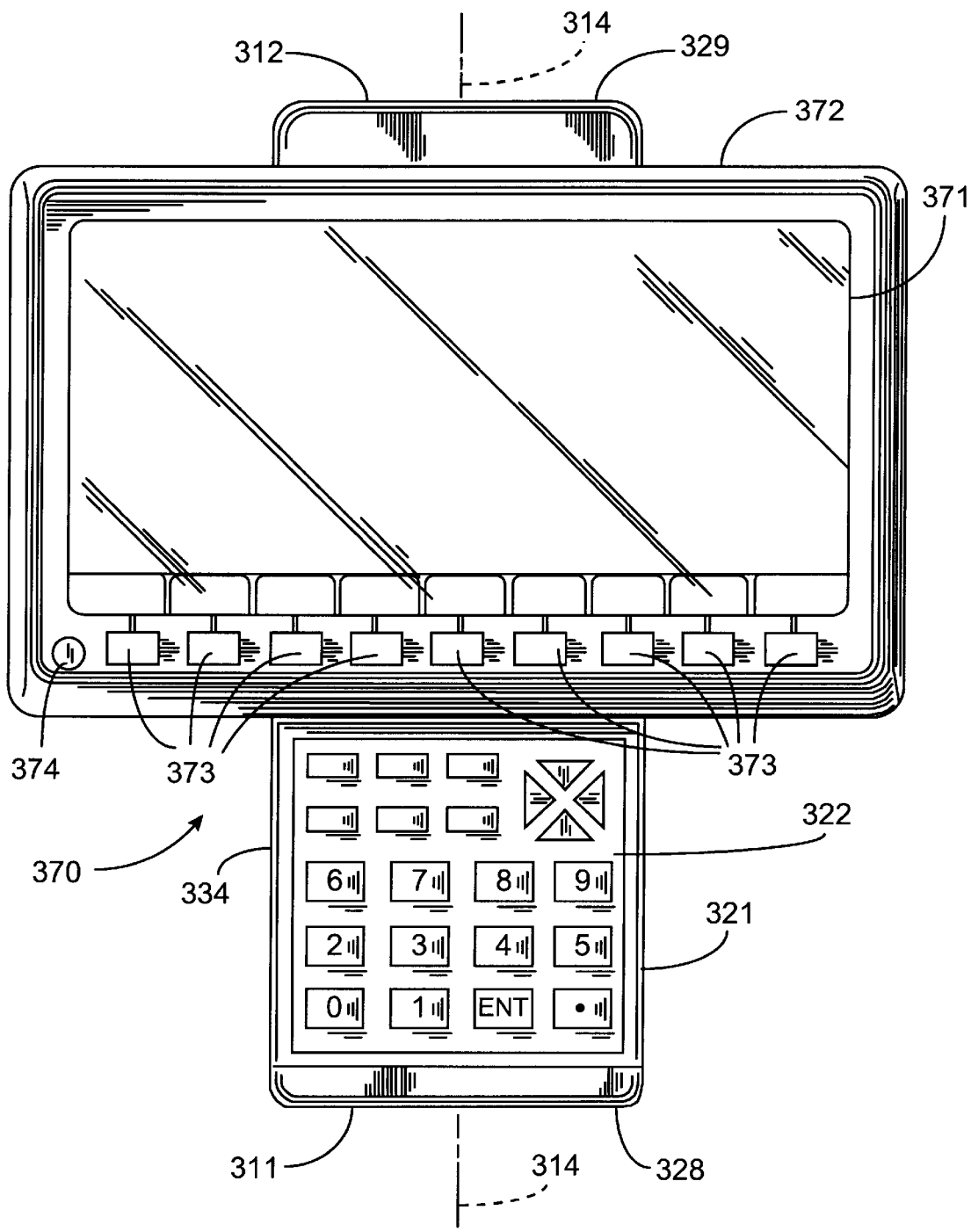
FIG. 28 is a frontal view of yet another embodiment of a data collection terminal unit in accordance with the invention, the terminal unit showing a display screen which extends laterally beyond the basic longitudinal shape of the terminal unit.

FIG. 28 is a frontal view of yet another terminal unit (370), having uniquely wide screen (371) disposed in a display screen module (372). The display screen module (372) is mounted in the manner described with respect to the display screen module (316) to the keyboard module (321). The display screen module (372) extends to both sides with respect to the central axis (314) of the terminal unit (370) beyond the width of the base module (334) or (366) and the keyboard module (321). The size of the display screen (371) permits only a limited number of function keys (373) which are preferably disposed adjacent the outer edge of the keyboard (322). The display screen module (372) may also include a power switch (374) when such a function is not part of the keyboard module (321) and its respective keyboard (322). It should be realized, however, that without diminishing the width of the display screen (371), the number of display lines thereon may be diminished to include on another display screen module an alphabetical keyboard.

Figure 29:
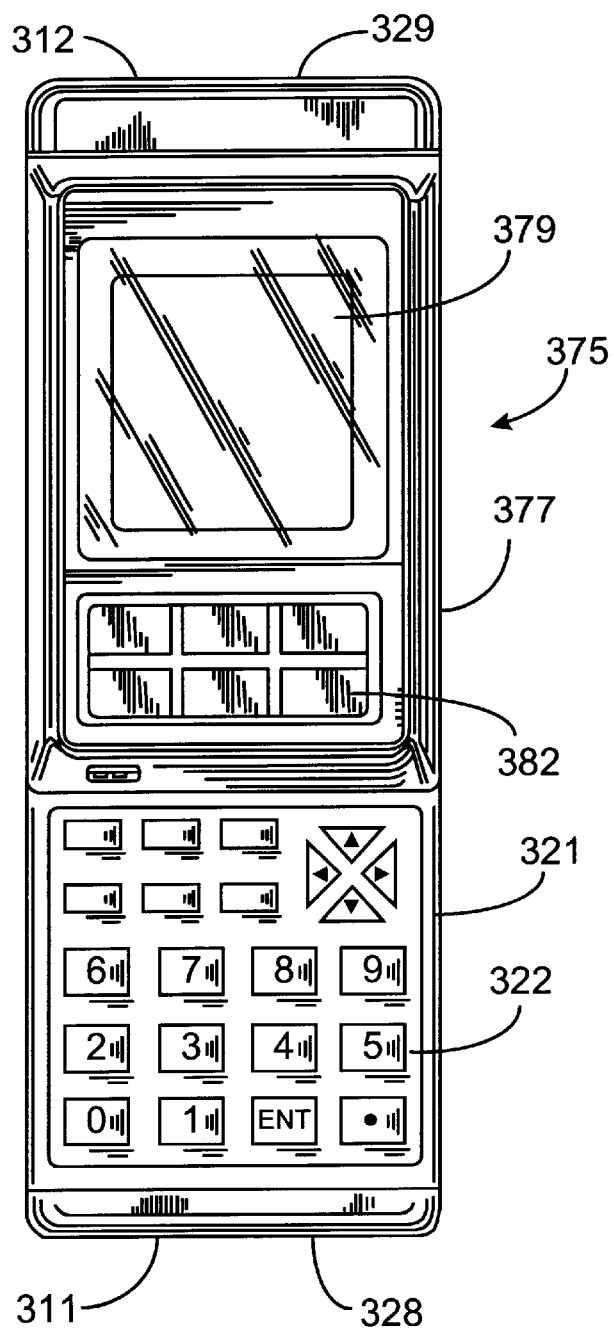
FIG. 29 is a frontal view of a data collection terminal unit similar to the terminal unit shown in FIG. 23, except that a display screen module is shown which is confined to the generally longitudinal shape of the data collection terminal unit.
Figure 30:
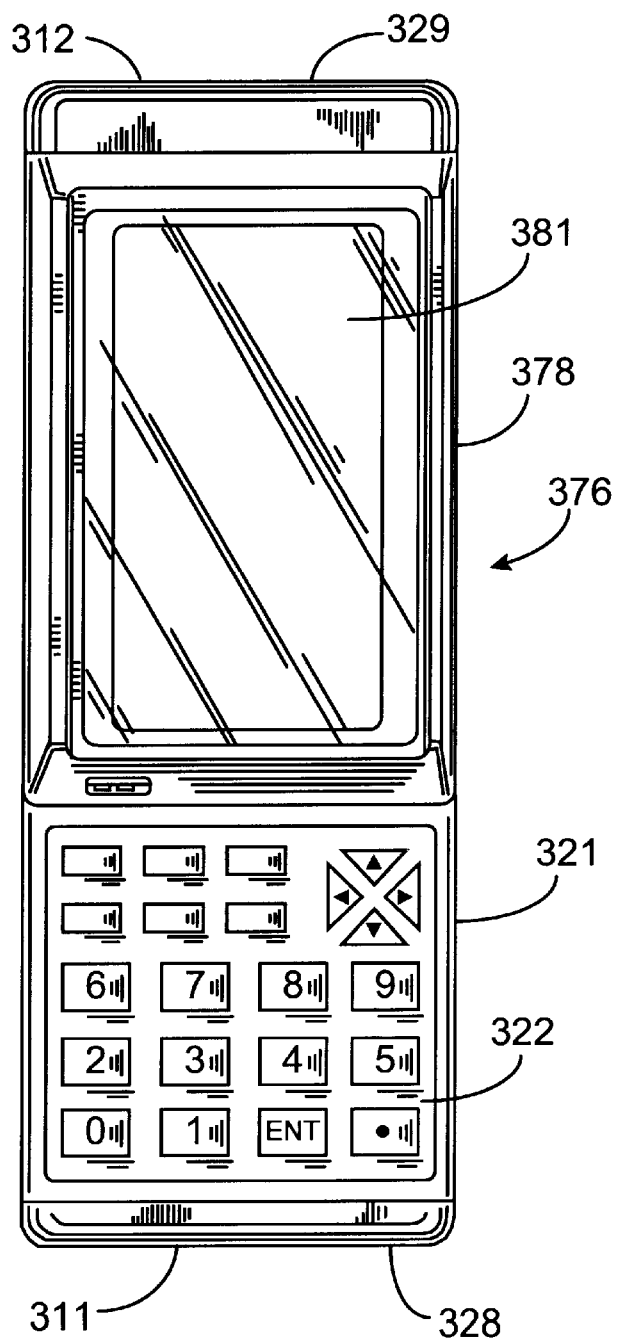
FIG. 30 is a frontal view of another embodiment of a data collection terminal unit in which the display screen module of the terminal unit in FIG. 29 has been replaced by an elongate display screen module in which function or control keys have been eliminated to afford room for added display area of the display screen.

FIGS. 29 and 30 show terminal units (375) and (376), respectively. Both terminal units show display screen modules (377) and (378), respectively, in which respective display screens (379) and (381) are contained within the lateral bounds of the keyboard module (321).

The display screen module (377) includes function keys (382), arranged in an earlier referred to arrangement. In contrast, the display screen module (378) does not include the function keys (382) but is instead in the direction between the inner and outer ends (311) and (312) of the terminal unit (376), hence in the vertical direction of the display screen enlarged. Thus, FIGS. 29 and 30 show further embodiments of the terminal unit that can be provided with only minor modifications in the assembly of the respective units.

Figure 31:
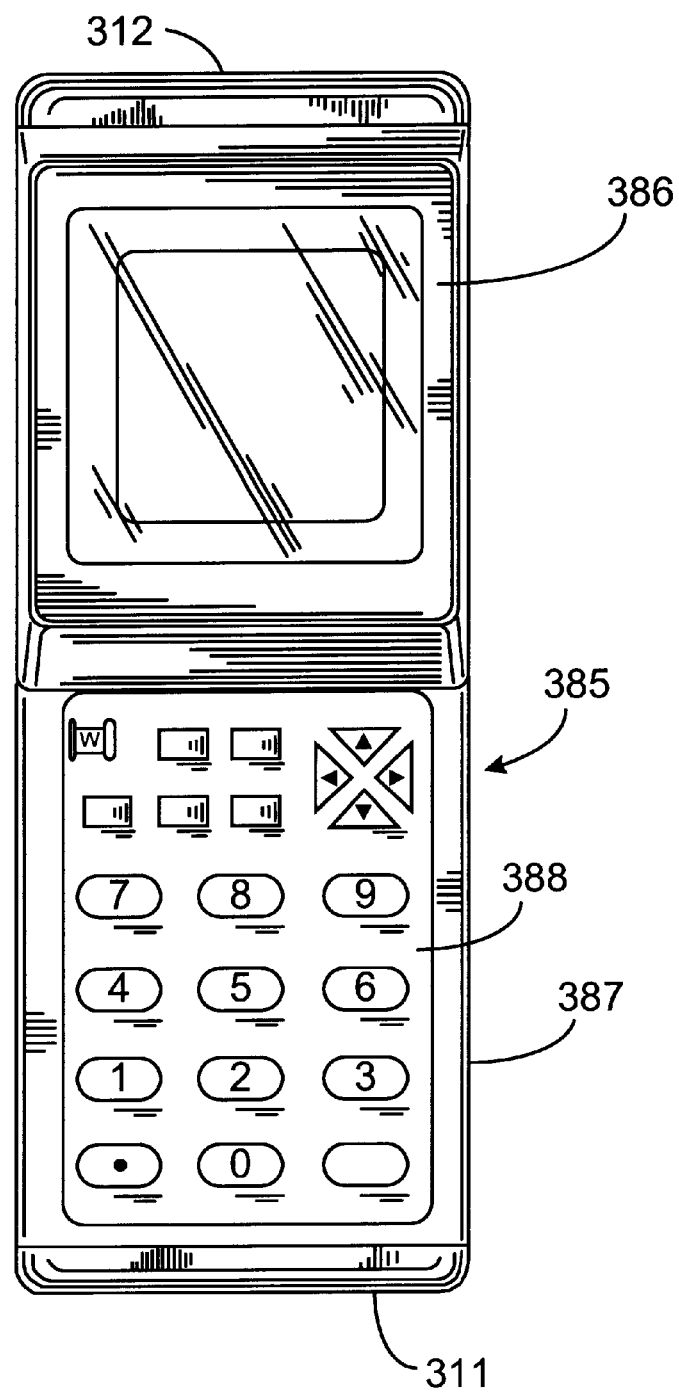
FIG. 31 is a frontal view of a data collection terminal unit showing a first keyboard array adjacent an inner end of the terminal unit and a display screen module adjacent an outer end of the terminal.
Figure 32:
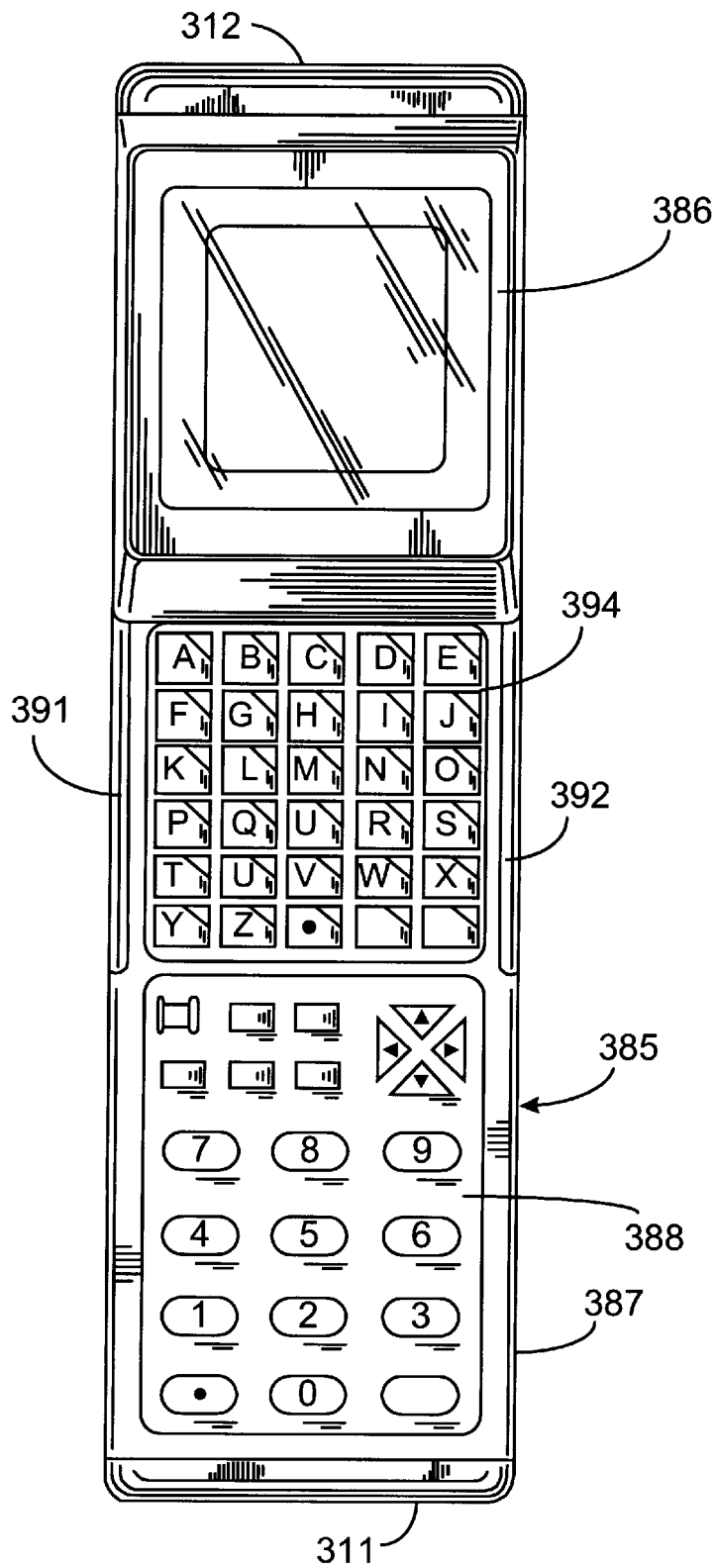
FIG. 32 is a frontal view of the data collection terminal unit shown in FIG. 31, in which the display screen module has been extended outwardly away from the user to uncover a second keyboard array which is in the non-extended position of the display screen module disposed beneath such module.

FIG. 31 is a frontal view of a data collection terminal unit (385) which features a variation of the described keyboard and display screen modules. The terminal unit (385) includes a display screen module (386) and a keyboard module (387). As in the previously described terminal unit, the keyboard module (387) extends substantially between the inner and outer ends (311) and (312) of the terminal unit (385). A first keyboard (388) is mounted into an innermost end of the keyboard module (387). However, the display screen module (386) is outwardly slidably mounted to slide from an innermost position as shown in FIG. 31 to an outermost position shown in FIG. 32. Sliding motion is supported by rails (391) and (392) disposed along opposite sides of the terminal unit (385). In the outermost position of the display screen module (386), a second keyboard (394) is uncovered, in that the second keyboard is located directly adjacent the innermost position of the display screen module (386). The second keyboard (394) may be received by the keyboard module (387) in a recess similar to the keyboard (388). The first and second keyboards may be of different heights between inner and outer ends, or the keyboards may be configured to be of equal height. In such a configuration, the keyboard module may be provided with proper recesses which are of the same size. In the described embodiment, the first keyboard has a greater vertical height than the second keyboard, and respectively differently sized cavities for receiving the first and second keyboards (388) and (394) are provided. The differences in size may prevent an inadvertent switching of the respective keyboards (388) and (394) during assembly of the terminal unit (385).

Figure 33:
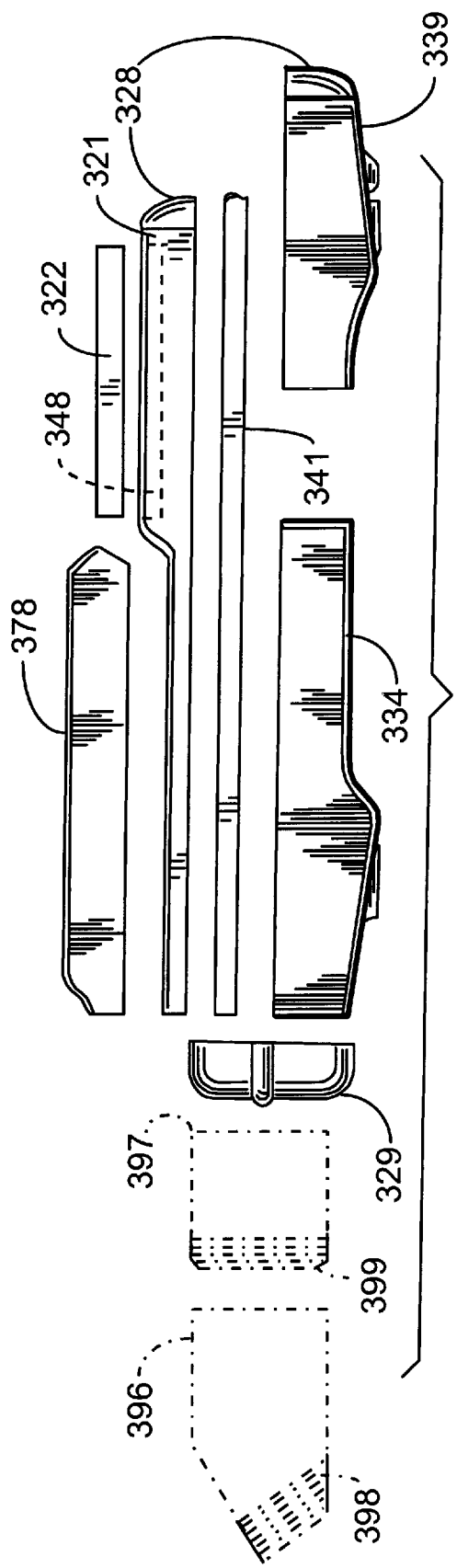
FIG. 33 is a schematic representation of various modules and elements of the terminal unit showing a basic manner of assembling selected ones of the various modules to each other.

FIG. 33 is a schematic representation of various modules and elements of the described terminal units showing a basic manner of assembling selected ones of the various modules to each other. In particular, the base module (334) is shown adjacent the battery module (339). The two modules may be combined initially or at a later time in that it is contemplated to facilitate the replacement of the battery module (339) without further disassembly of the respective terminal unit. The resilient spacer (341) is preferably a rubber compound which may be of a hardness to absorb a typical fall of the unit. The spacer (341) is assembled between the base module (334) and the keyboard module (321) or a similar keyboard module. A selected keyboard and display screen module is assembled to the selected keyboard module prior to this assembly to the base module (334) or its selected equivalent base module. The outer end cap (329) may be removed or initially deleted from the assembly and a CCD type scanner module (396) or a laser scanner type module (397) may be attached to the outer end (312) of the terminal unit. FIG. 33 shows such scanner modules (396) and (397) in phantom lines as alternative additions to the respective terminal unit. In maintaining the shock absorbing characteristics of the assembled terminal unit, such as terminal unit (310), if a scanner module, such as shown at (396) or (397), is included at the outer end (312) of the terminal unit (310), the scanner modules are desirably furnished with a resilient end cap (398) or (399), respectively.

Figure 34:
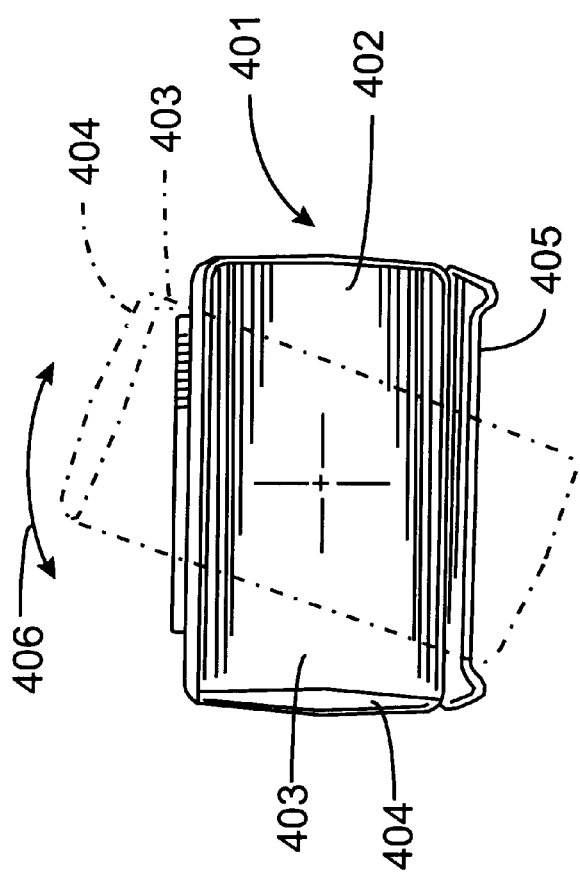
FIG. 34 is a somewhat simplified view of a data collection terminal unit in which a scanner module is mounted to an outer end of the terminal unit, the scanner module including a screen head which is mounted to rotate about a longitudinal axis of the data collection terminal unit.

FIG. 34 is a simplified view onto an outer end (312) of a data collection terminal unit (401) in which a scanner module (402) is mounted to the outer end. The scanner module (402) is shown in a rest mode in which the scanner is less likely to be operated. The scanner module (402) has a scanning head (403) including an optical opening (404) through which scanned data are acquired. In the typically inactive position of the scanner module (402), any scanning would be done with the optical opening pointing toward one side of the terminal unit (401). In such position, a user is not able to direct the scanning operation straight ahead while at the same time viewing a display screen (405) on the upper face of the terminal unit (401). To overcome the limitation, the scanning head (403) is rotatably or pivotably attached to the scanner module (402) to pivot about the longitudinal central axis (314) through the terminal unit (401). Preferably, the scanning head (403) may be moved to a number of intermediate positions between the lateral positions in which the optical opening (404) points to either side of the terminal unit (401). A particular number of positions, such at fifteen degrees increments may be preferred. Thus between opposite extreme lateral positions, the scanning head may be pivoted through an angle of at least 180 degrees. An alternate, angularly disposed orientation of the scanning head (403) is shown in phantom lines as an example of the pivotable movement of the scanning head (403). The pivotable movement in either direction from the alternate position shown is indicated by an arrow (406).

Figure 35:
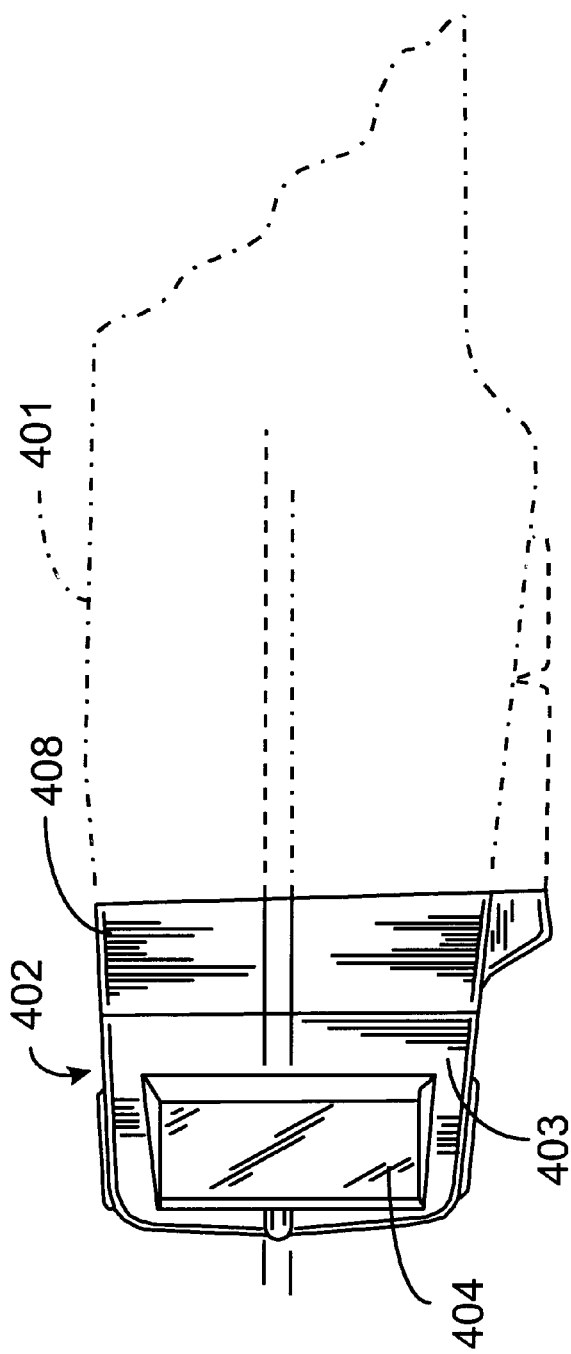
FIG. 35 is a side view of a scanner module, such as in FIG. 34, shown with the scanner head in a typical, laterally disposed rest position.

FIG. 35 shows a side view of the data collection terminal unit (401). The scanner module (402) may be attached to the outer end of the data terminal unit by removing the end cap (429) and attaching in its place a mounting base (408) of the scanner module (402). Internal data communications connections which are not shown, would include a typical data bus coupled to the microprocessor control of the data collection terminal unit (401) to permit the scanner module (402) to be operated as an integral element of the data collection terminal unit (401). The position in which the scanning head (403) is shown, is a typical rest position for the scanner module, in which the scanner would be least likely to be operated.

Figure 36:
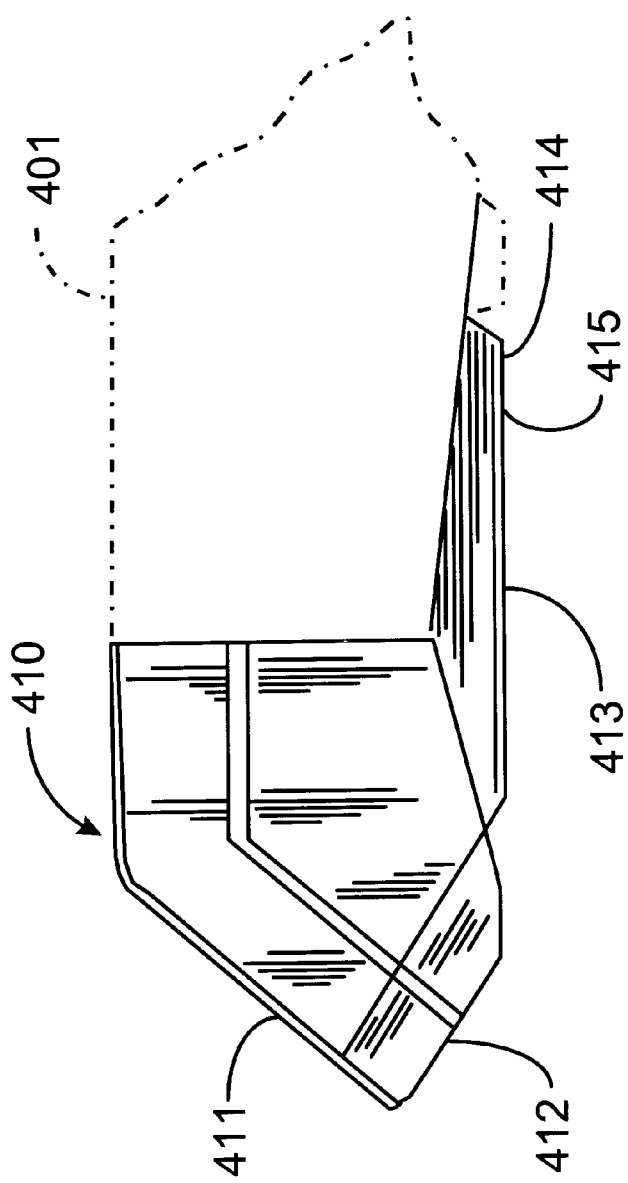
FIG. 36 is a side view of an alternate embodiment of a scanner unit, the scanner unit being fixedly attached to an outer end of the terminal unit and having a viewing direction at an angle with respect to the longitudinal axis of the data collection terminal.

FIG. 36 is a side view of an alternate embodiment of a scanner module (410). Contrary to the scanner module (402), the scanner module (410) is not pivotally attached by the base (408). Instead, a fixed scanner head (411) is shown in which the direction of scanning may preferably be at an angle in a range about 45° from the longitudinal axis of the data collection terminal unit (401). To increase the shock absorbency of the scanner module outer surface, a window portion (412) of the scanner head (411) is protected at its outer rim with preferred rubber cushioning, a shock damper having been found supportive of preventing breakage of the data collection terminal unit (401) and particularly of the scanner head (401). The scanner module (410) further comprises an inward extension (413) adjacent a lower surface (414) of the data collection terminal unit (401). A threaded fastener (415) may be used to fasten the extension (413) to the underside (414) of the data collection terminal unit (401). It should be recognized that other modifications and changes may be made with respect to the laser scanner heads attached to the outer end of the data collection terminal unit in furtherance of the objects of the invention.

Figure 37:
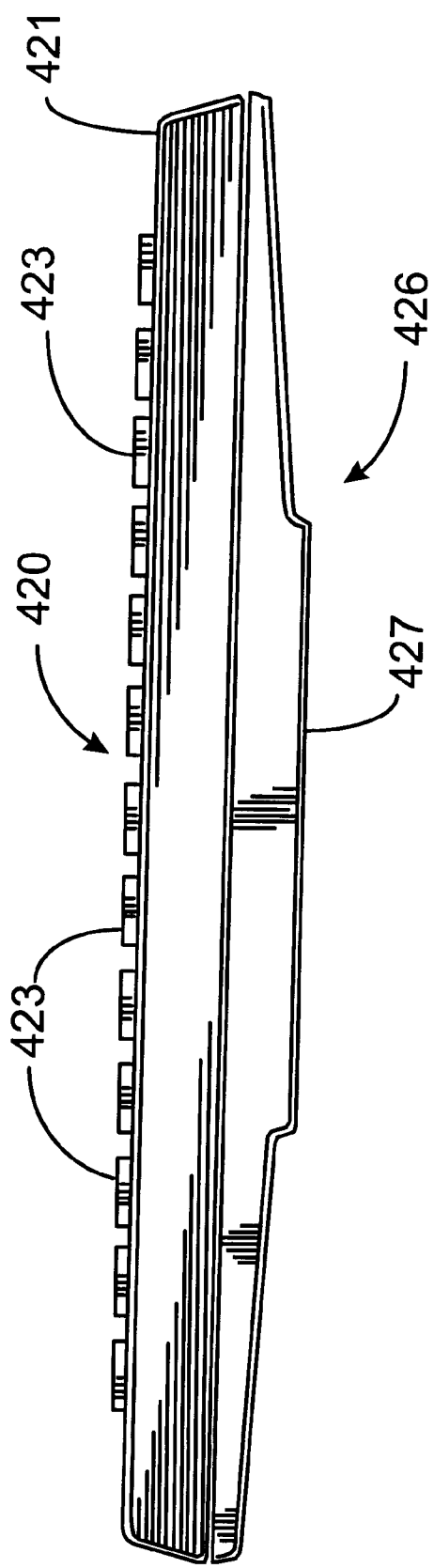
FIG. 37 is an end view of a display screen module of the type shown in FIG. 28, the end view showing an attachment surface of the display screen module.

FIG. 37 is an end view of a display screen module (420) of the type of display screen module (372) shown in FIG. 28. The end view shows an upwards directed display screen surface (421), also showing in profile, a plurality of keys (423) which may be a combination of alphanumeric keys and function keys for implementing functions of the display screen module (420). Also shown as an edge view or in profile is a sculptured lower surface (426) of the display screen module (420). Preferably, a central portion (427) of the lower surface (426) is a flat surface portion of substantially the same width as an interface surface of the respective keyboard module to which the display screen module typically mounts.

Figure 38:
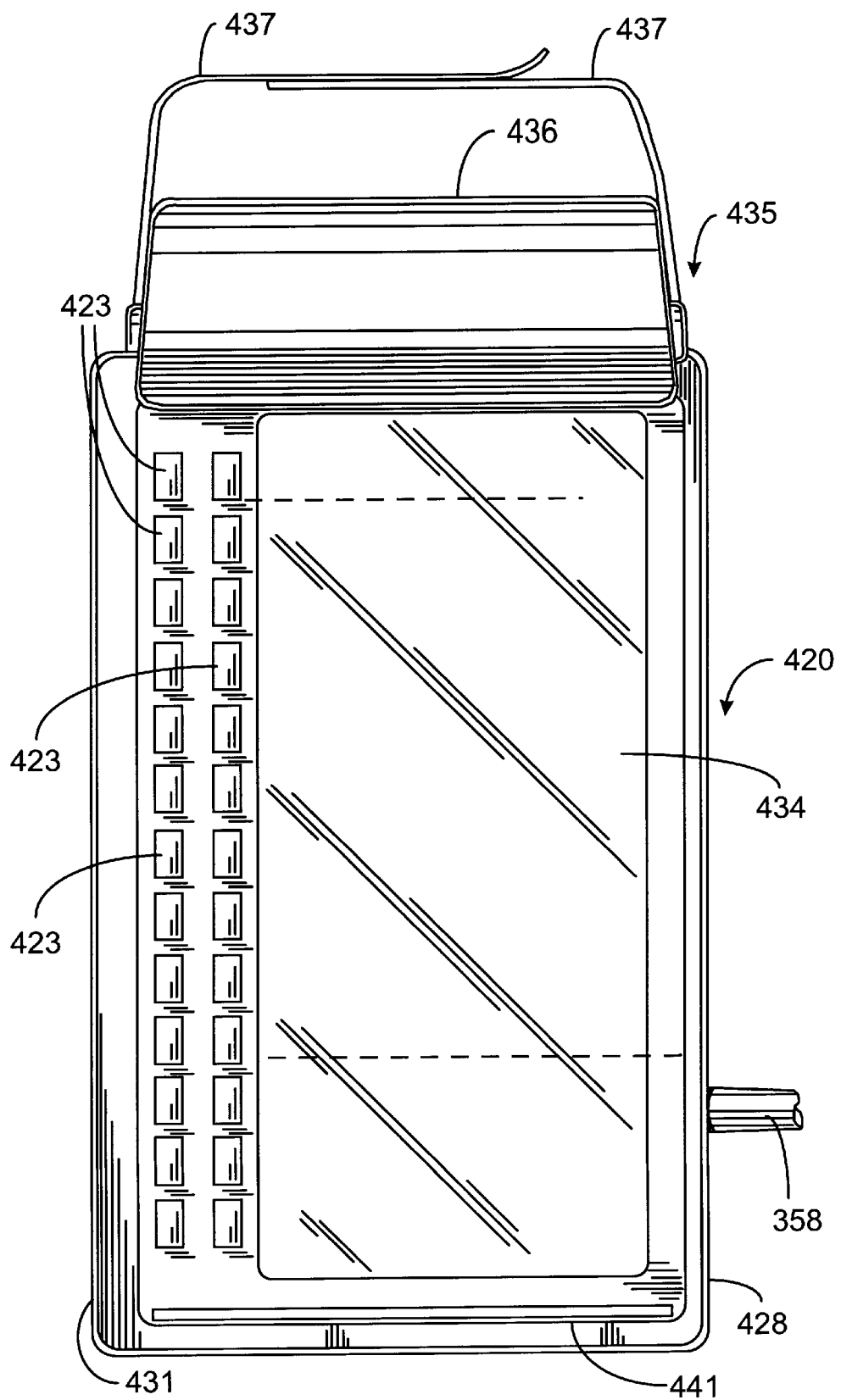
FIG. 38 is a frontal view of the display screen module of FIG. 37 in combination with a handle and power supply module.

FIG. 38 shows a frontal view of the display screen module (420). An outer end (428) of the display screen module (420)

may feature an antenna, such as the antenna (458) of the transceiver unit (459) shown in FIG. 26, for example. Adjacent an inward facing edge (431) of the display screen module (420) may be located an array of the plurality of keys (423) which may be alphanumeric, of numeric and a combination of function keys arranged in one or more rows as illustrated. Outward adjacent the keys (423) there is a display screen (434) capable of displaying multiple rows and columns of graphic symbols or of alphanumeric information or data. A handgrip module or handle module (435) is shown as extending toward the left hand side of the display module (420) with respect to the inner edge (431) as a base line. The handle module (435) includes a grip portion (436) which also functions as a battery compartment. A strap (437) may overlie the grip portion (436), such that a user may slip a hand between the grip portion (436) and the strap (437). The strap (437) preferably includes two strap halves which may be attached to each other at various lengthwise displaced distances by typical hook and loop fastening materials for adjustment.

Figure 39:
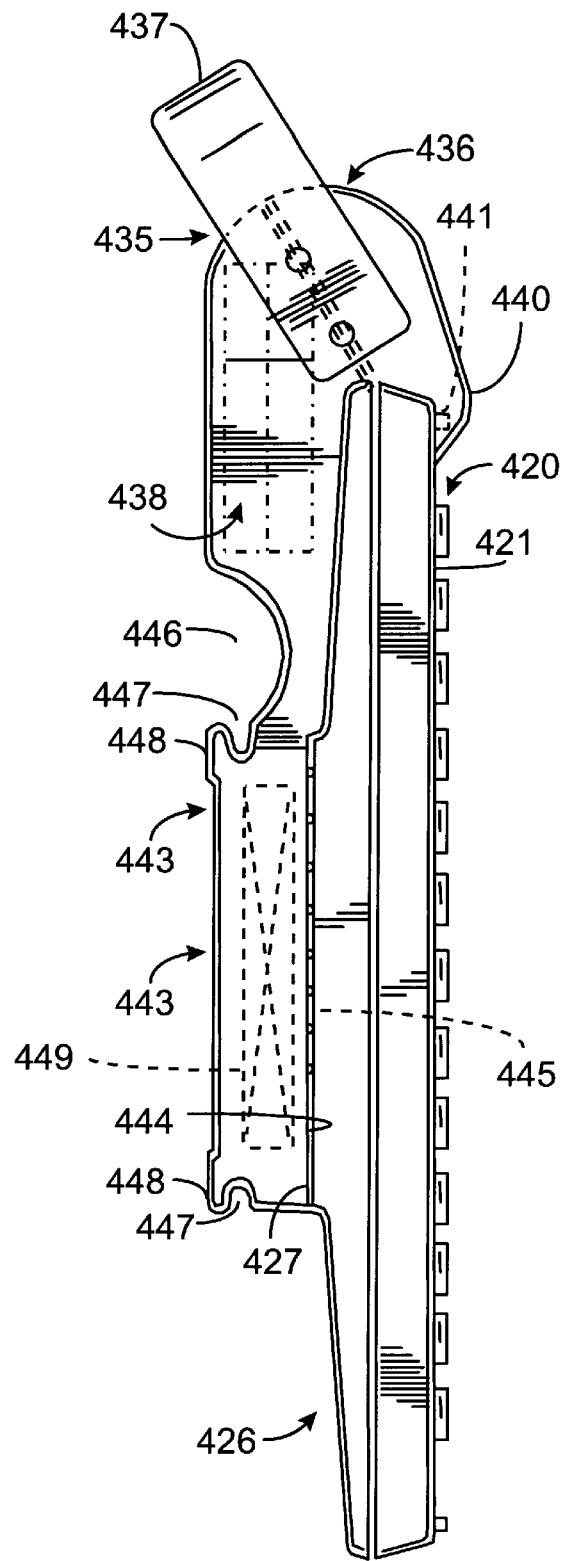
FIG. 39 is a side view of the display screen and handle and power supply modules of FIG. 38.

FIG. 39 is a side view of the display screen module (420) and handle module (435). A battery module (438) is disposed within the hand grip portion (435). An upper lip (440) of the grip portion (436) overlies the upper surface (421) of the display screen module (420). The upper lip (440) preferably engages a retainer ridge (441) disposed on the upper surface. An identical retainer ridge (441) may be disposed on the other side of the display screen module (420), such that the handle module (435) becomes reversible and may be attached to one side as shown, or to the other side of the display screen module, depending on the preference of the user. The handle module (435) has an elongate support portion (443) which extends along the lower surface (426) of the display screen module (420) and is preferably mounted to the central portion (427) of the lower surface (426). Electrical contact between the handle module (435) and the display screen module 120 may preferably be made across an interface (444) at the central portion (427). A plurality of spaced electrical contacts (445), disposed substantially in the plane of the interface (444) establish electrical and communication contact between the handle module (435) and the respective display screen module (420). A recess (446) in the support portion (443) is part of the grip portion. Adjacent the recess (446), oppositely spaced, parallel guide tracks (447) provide for the handle module to be slidably inserted into and to become electrically coupled to an external power supply and battery charger unit (not shown). A plurality of electrical power and communication contacts (448) establish contact for electrical power and signal communication with such a power supply and battery charger unit. A transceiver module (449) may be disposed within the support portion (443) for communication between an external data device (not shown) and the display screen module (420), such that data from the external data device may be displayed to be accessible to a suer of the combination of the display screen (420) and the handle module (435). The described combination consequently refers to an alternate use of the display screen module (420) in addition to the previously described use of such a display screen module in combination with a keyboard assembly, as, for example, with respect to the data collection terminal unit (370).

Figure 40:
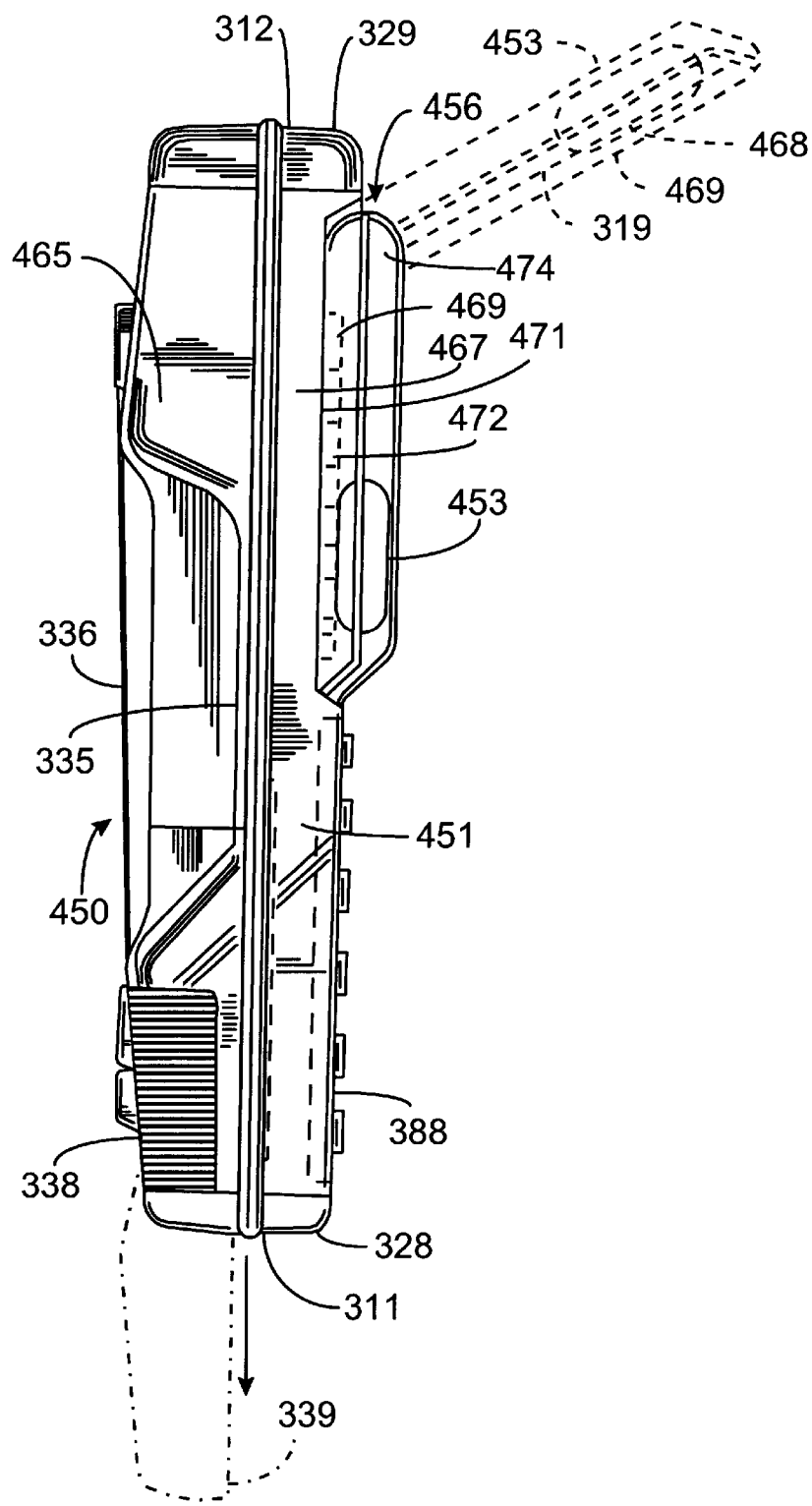
FIG. 40 is a frontal view of a data collection terminal unit shown in an alternate embodiment of a keyboard module in combination with a display screen.

FIG. 40 is a frontal view of a data collection terminal unit (450) showing a keyboard module (451). The keyboard module (451) differs from a previously described keyboard module (387), for example, in that a display screen module (453) is pivotally attached to an outer end (454) of the keyboard module (451). The display screen module (453) accordingly necessarily requires a hinged attachment to a respective module, such as the keyboard module (451). A hinge (456) includes display screen hinge members (457) and complementary hinge discs (458) of the keyboard module (450). A hinged attachment of the display screen module (453) to the keyboard module (451) shows an interleaved disposition of the disc-like, spaced hinge members (457) with the complementary hinge discs (458) of the keyboard module (451). The respective hinge members (457) and hinge discs (458) may include laterally disposed electrical contact members disposed on respectively facing surfaces thereof to couple electrical power and data communication from the keyboard module (451) to the display screen module (453). It is contemplated that the display screen module be pivoted from a first, closed position to a preferred open position selected from a range of possible positions, such as may be suitable and most convenient to a user. The keyboard module (451) may include a keyboard, such as the keyboard (388) described with respect to FIG. 32, for example. Keyboards which differ in their configuration from the configuration of the keyboard (388) but which are identical in electrical contacts and interface arrangements, and in physical dimensions may be inserted in lieu of the keyboard (388). The display screen module (453) has a first display screen (461) disposed in an outer surface (462) thereof. The size of the display screen (461) is one of choice, but may preferably be chosen to accommodate a typical numerical data display, hence be of a size substantially less than one which might occupy a major portion of the outer surface (462) of the display screen module (453). Similarly to the embodiment described in reference to FIG. 26, the data collection terminal unit (450) may include a transceiver unit (359) as indicated by the antenna (358).

Figure 41:
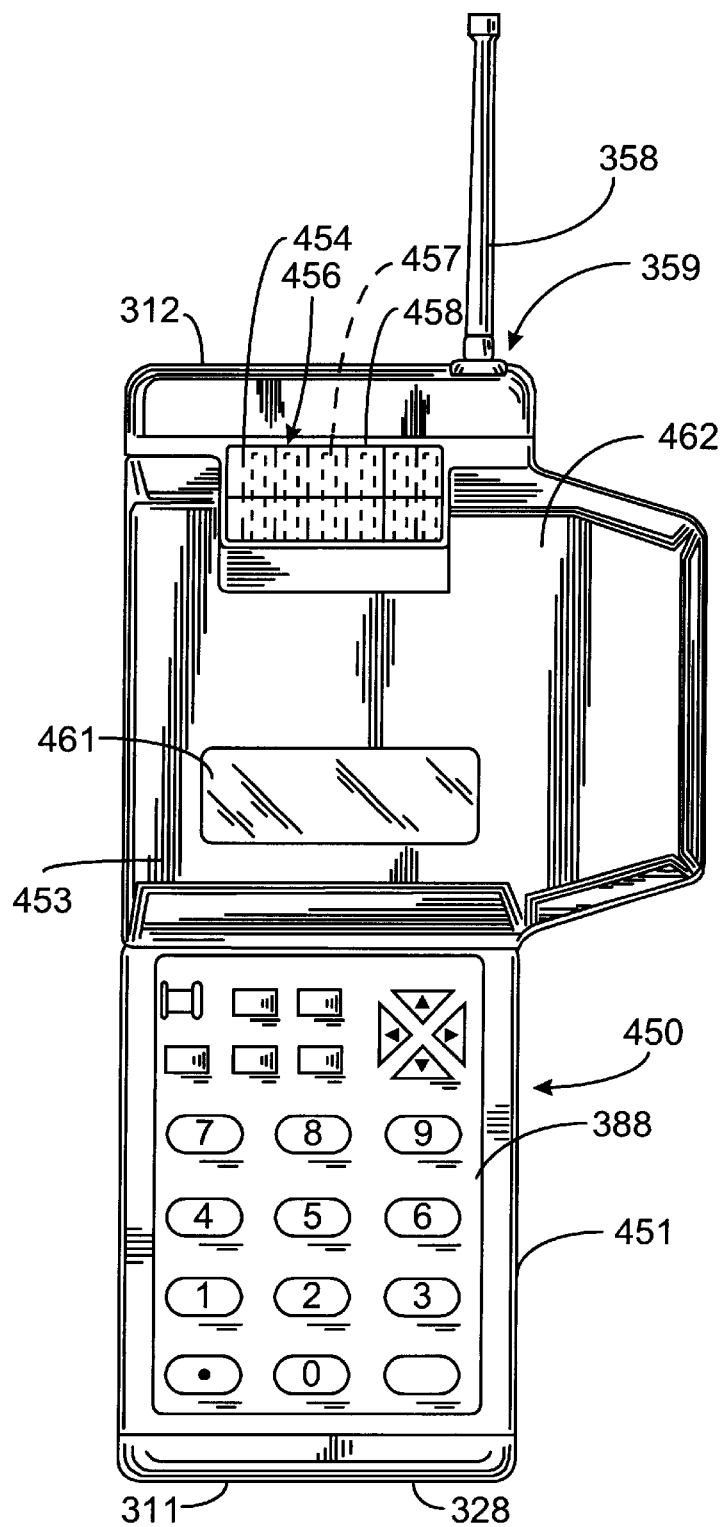
FIG. 41 is a side view of the data collection terminal unit shown in FIG. 40.

FIG. 41 is a side view of the data collection terminal unit (450). The terminal unit (450) includes a typical base module (465), similar to the base module (334) described with respect to FIG. 24 hereof. The base module (465) is shown as including the handgrip portion (335) and the strap (336). Resilient, shock absorbing end caps (328) and (329) are desirably attached to the respective inner and outer ends (311) and (312) of the data collection terminal unit (450). The display screen module (453) is shown in the first or closed position. The closed position is considered also the normal position in which the module (453) is disposed essentially against an outward disposed portion (467) of the keyboard module (451). The display screen module (453) may however, be pivoted into an upward or open position within a range of open positions, substantially as indicated by the alternate position of the display screen module (453) shown in phantom lines. As the display screen module is pivoted to such upward position, a second display screen (319) disposed on the normally hidden underside (468) becomes visually accessible to a user. The display screen (319) is preferably recessed with an outer rim (469) of the display screen module (453). In the downward pivoted position the display screen module (453) may cover an auxiliary or second keyboard (471). The additional keys (472) of the second keyboard (471) may add alphabetical keys and function keys to be accessed by the user. In achieving the advantages sought by the present invention, both the first and the second keyboards (388) and (421) are removably mounted to the keyboard module (451) and may be exchanged for keyboards of identical lateral extent and having different key arrangements on a front surface thereof. Thus, the keyboard (471) may be exchanged for another keyboard having keys for different data or control input to the respective data collection terminal unit. Also, depending on the type of operation contemplated by the user of the data collection terminal unit (450), the user may employ the unit with the display screen module (453) in a downward position with the first keyboard (388) being the sole keyboard available for data entry and the first display screen (461) providing a corresponding visual indication of data made available to the user. In the alternative, the user may pivot the display screen module into an upward pivoted position, giving access to a second display screen (319) which is in comparison to the first display screen (461) larger in active area and capable of displaying a greater amount of information. The second keyboard (471) to which the user has gained access simultaneously with the access to the relatively larger display screen (319) desirably provides the capability of alphabetical data information. Electrical provision in the hinge (456) may include position controlled contacts (474) which selectively activate the display screen (461) or the display screen (319) in response to an opening or closing of the display screen module (453) in the manner described. The display screen module (453) differs from the previously described display screen modules in that the display screen module (453) is hingedly attached to the respective keyboard module (451). In this manner, the display screen module (453) may be interchanged with other display screen modules having similar spaced hinge members (457) to be compatible with the hinge discs (458) of the keyboard module (451).

Figure 42:
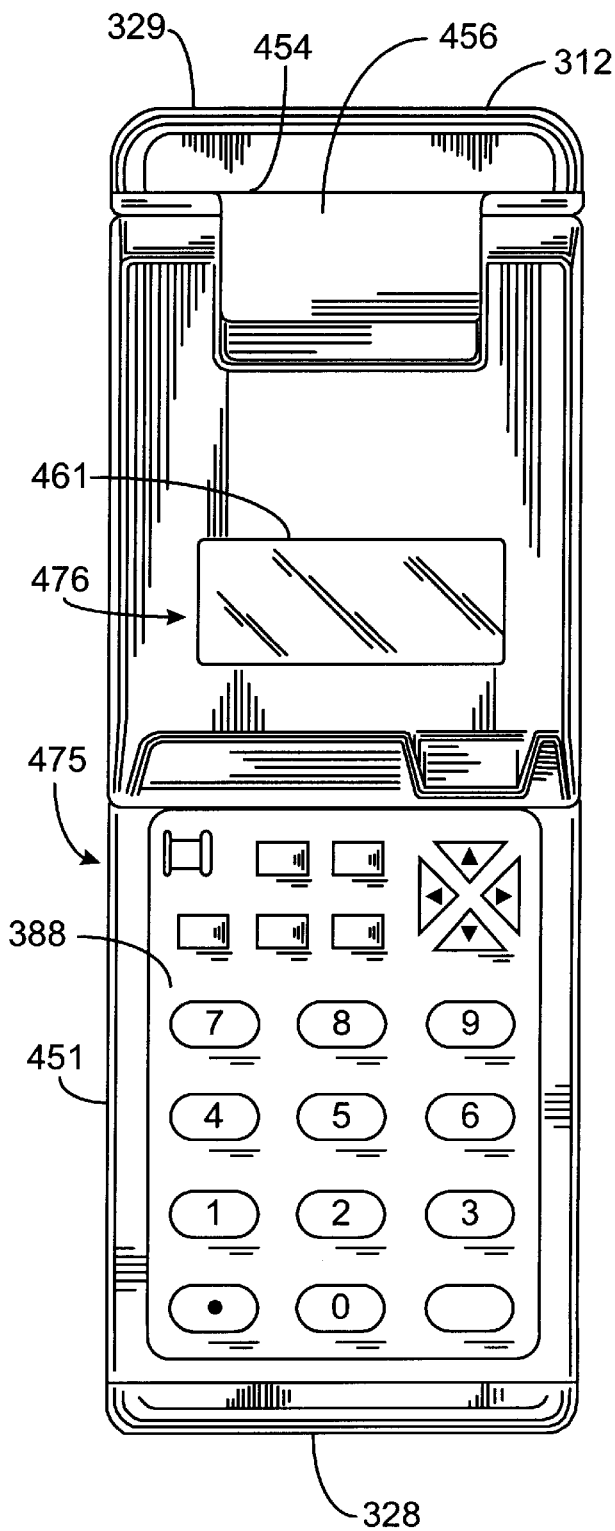
FIG. 42 is yet another embodiment of the data collection terminal unit shown in FIGS. 40 and 41, showing a screen display confined to the width of the keyboard module of the data collection terminal unit.

FIG. 42 is a frontal view of such alternate embodiment, showing a data collection terminal unit (475) which includes the described keyboard module (451). To the outer end (454) of the keyboard module (451) a display screen module (476) has been pivotally attached in lieu of the already described display screen module (453). In clear contrast to the display screen module (453), the display screen module (476) is laterally confined substantially to the overall width of the keyboard module (451) of the data collection terminal unit (475). The attachment of the display screen module (476) to the keyboard module (451) is identical to the attachment of the display screen module (453) at the hinge (456) as previously described. In the closed position of the display screen module (476), the first or outer display screen (461) may preferably be identical to the first display screen of the display screen module (453) in that in the closed position of the display screen module (476) only the first keyboard, preferably the numerical keyboard (388) is accessible to the user, and the size and display area of the display screen (461) is adapted to a desired display format commensurate with data input from the first keyboard, such as the keyboard (388).

Figure 43:
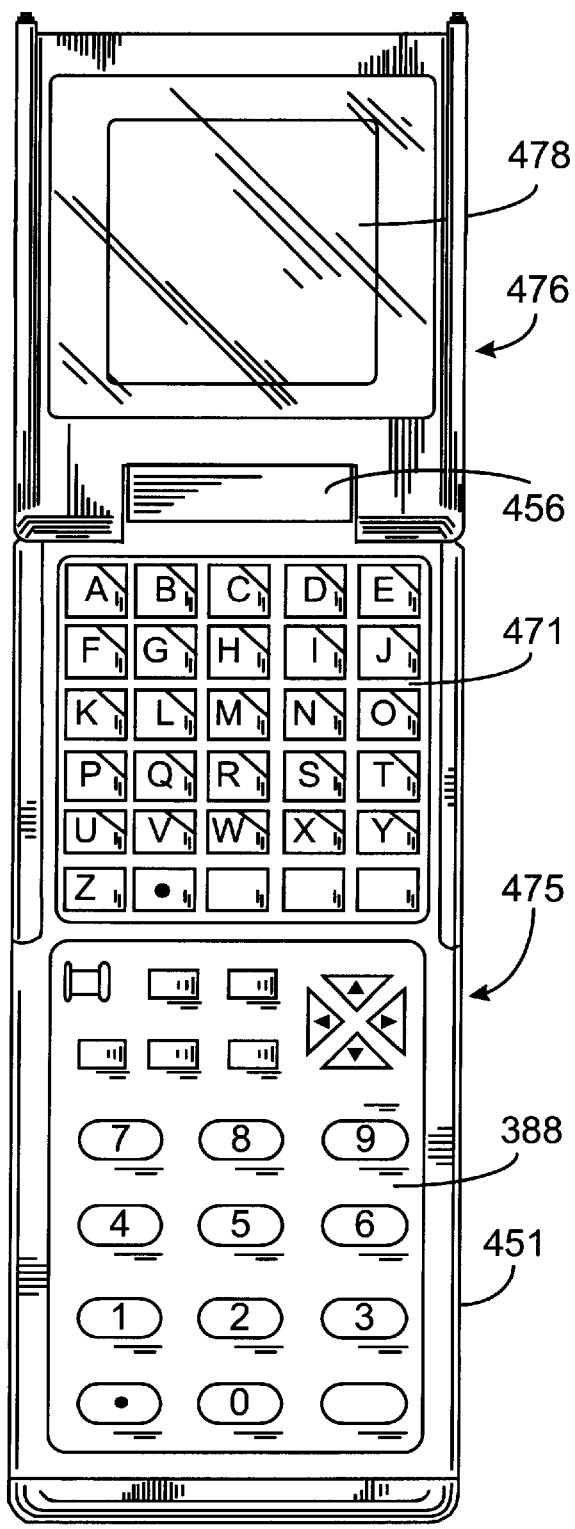
FIG. 43 is an alternate frontal view of the data collection terminal unit shown in FIG. 42 showing a pivotally mounted screen display in an open position, revealing a second screen display and a second keyboard.

FIG. 43 is an alternate frontal view of the data collection terminal unit (475), showing the display screen module (476) in an upward pivoted position. The pivoted position reveals the second keyboard (471) of the keyboard module (451) and makes a second display screen (478) of the display screen module (476) accessible to the user. Consequently, as shown in FIG. 43, the user may now manually enter data by manipulating any of the keys which make up the keyboards (388) and (471). The combination of the substantially numerical keyboard (388) and the substantially alphabetical keyboard (471) results in a complete alphanumerical keyboard. As described, pivoting the display screen module (476) from a closed position, as shown in FIG. 42, to the open position of FIG. 43, would be effective in one embodiment to switch displayed information from the first display screen (461) to the second display screen (478).

Figure 44:
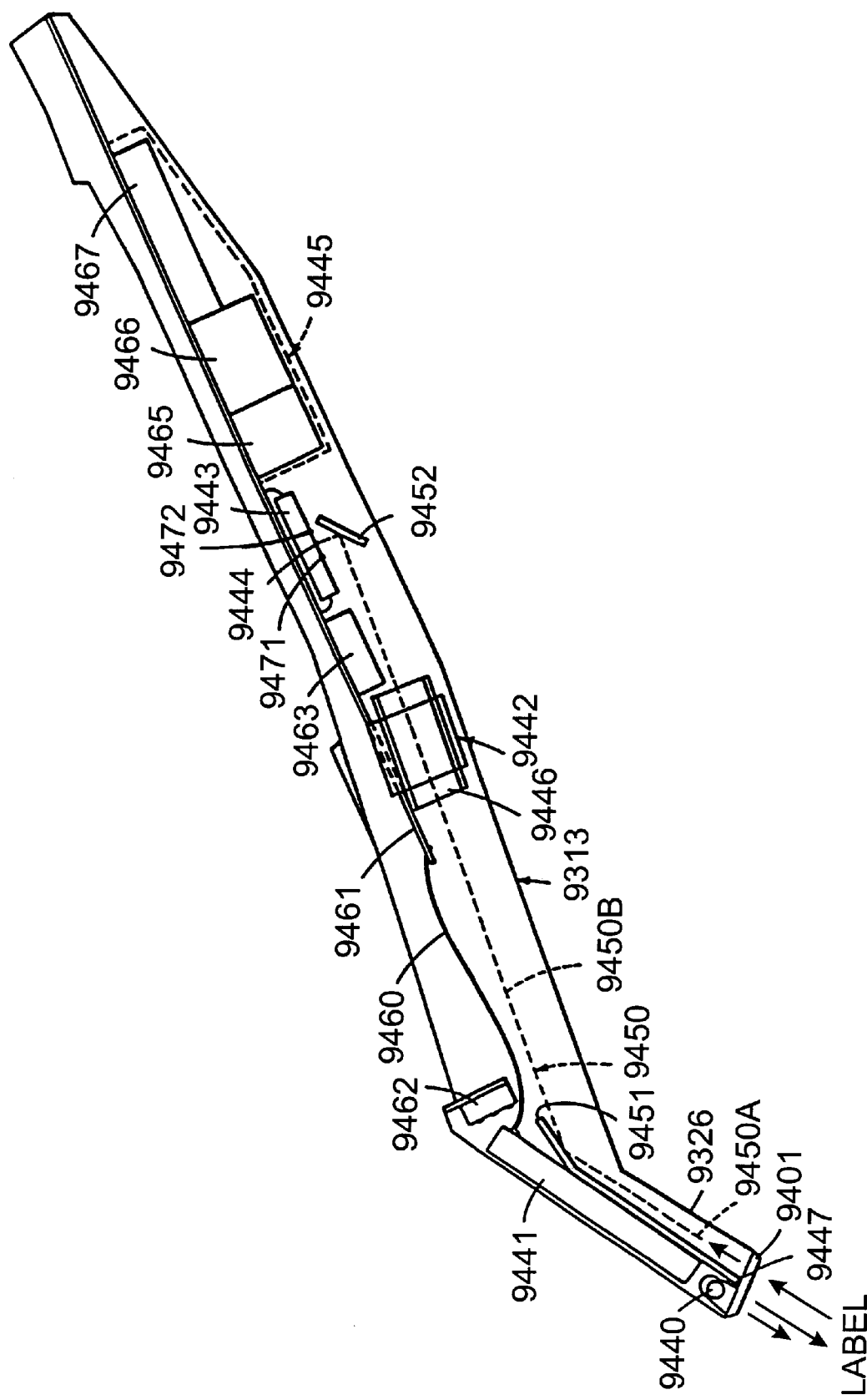
FIG. 44 is a diagrammatic view indicating an exemplary lay-out of parts within a scanner module.

By way of example, FIG. 44 illustrates a layout of parts for the case of a scanner module which illuminates a bar code label or other data source simultaneously over its entire extent, the reflected light image being stored in an image sensor array such as a CCD image sensor array for electronic conversion into a scanner data signal. For example, respective elements of the reflected light image may control the generation of charge in respective sensor elements, the charge states being simultaneously transferred to a shift register for readout as a serial scanner data signal.

A scanner of the reflected light image-image sensor type is shown in U.S. Pat. No. 4,877,949 issued Oct. 31, 1989.

The following tabulation identifies various components shown in FIG. 44 and indicates parenthetically the related reference numerals from the first and third figures of the incorporated U.S. Pat. No. 4,877,949:

Illuminator 9440 (15, first figure; 35, third figure)

Illumination Voltage Generator 9441 (17, first figure)

Automatic Reading Distance Adaptation Means 9442 (20, first figure; 103, 105, 102, 101, 90, third figure)

Image sensor means 9443 (11, first figure) with photosensor 9444 (13, first and third figures)

Control and Processing Means 9445 (10, first figure).

FIG. 44 departs from the showing in the third figure of the referenced U.S. Pat. No. 4,877,949 in having the reflected image follow a single tier longitudinal path 9450 in the relatively thin layer-like scanner module body 9313. In this way, the thickness of the scanner module body 9313 may be substantially less than the thickness of the RF data terminal, for example. The reflected image path is altered by a first mirror 9451 and a second mirror 9452 so that the image path 9450 has a single tier path segment 9450A within extension 9326 and a single tier path segment 9450B within the main section of the scanner module.

Detailed Description of FIGS. 45–56

Figure 45:
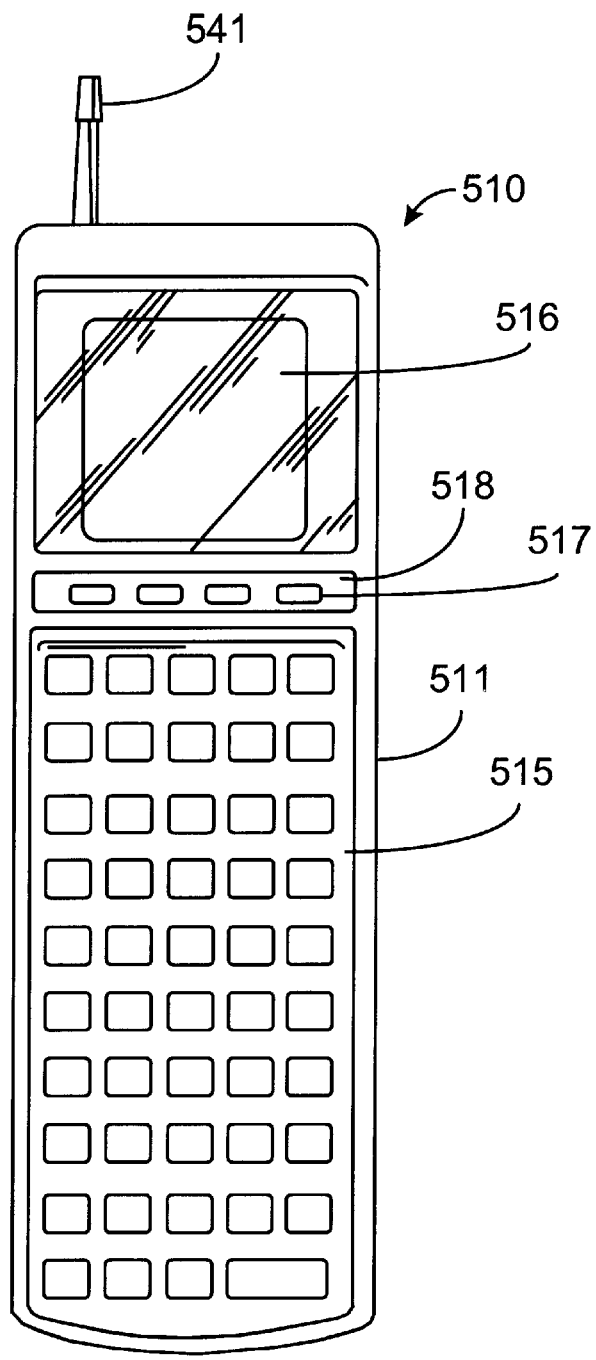
FIGS. 45, 46 and 47 are somewhat diagrammatic plan, side elevational and end views showing a modular data capture system wherein the user interface module and the peripheral modules are readily removed and replaced with modules of the same or different characteristics.
Figure 46:
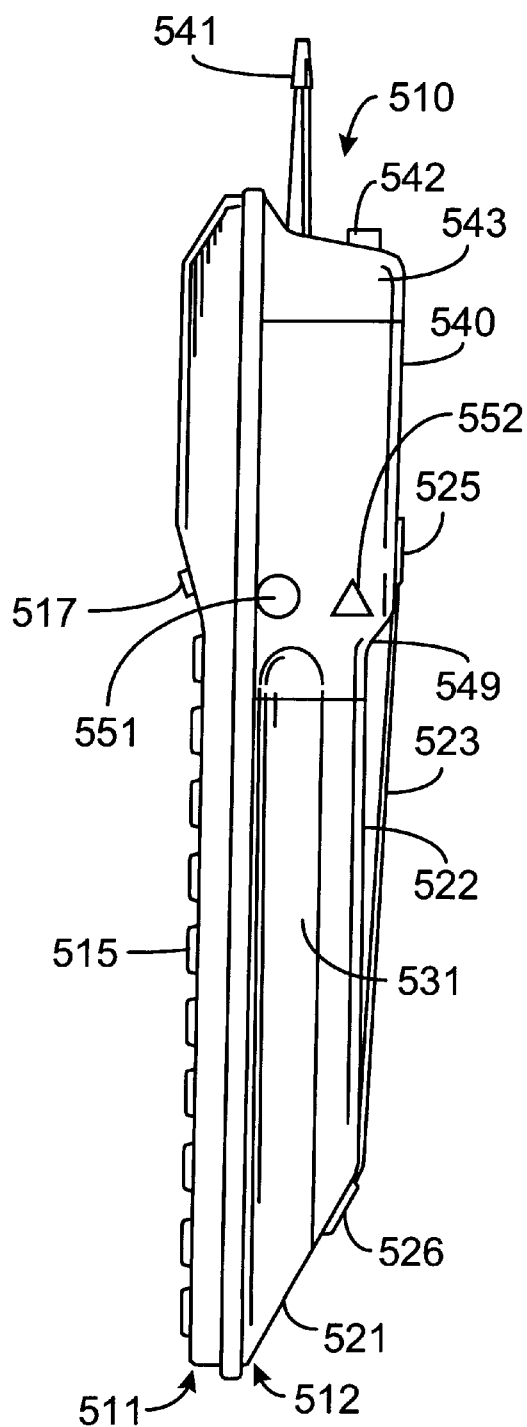
Figure 47:
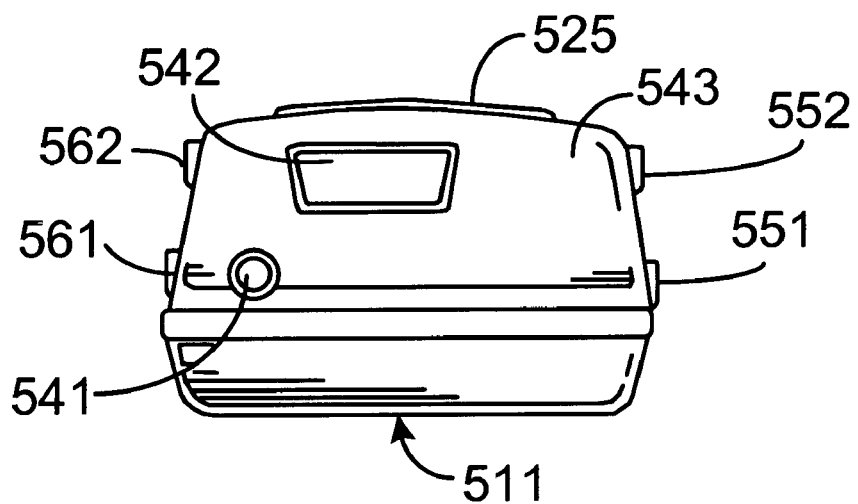

FIGS. 45–47 illustrate a modular hand-held data terminal 510 comprised of a user interface terminal portion or module 511 and a hand-held terminal part 512 joining the interface terminal portion along a juncture plane as indicated at 513. The user interface terminal portion 511 may be comprised of a main keyboard 515 having forty-nine manually actuatable selectors, a display 516, and a set of special keys 517 which may have a readily removable label panel 518 associated therewith so that label indicia for the respective keys 517 may be readily changed.

Figure 50:
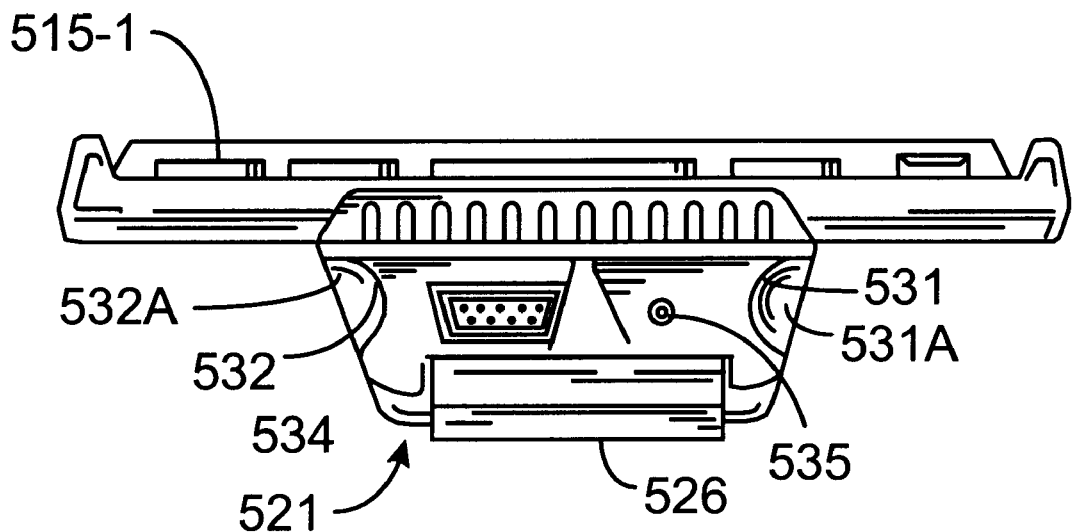

The hand-held terminal part 512 may be comprised of a battery/controller module 521 with a rounded grip-conforming configuration 522 having a hand strap 523 longitudinally spanning the same. The hand strap 523 may be of elastic material and may have hooks 525, 526 which are maintained engaged in receiving blind apertures by virtue of the resiliency of the strap. Module 521 is illustrated as having elongated grooves 531 (FIG. 46), 532 (FIG. 50) which are adapted to receive the fingers of the left or right hand, respectively, when engaged with the grip-conforming configuration 522. As best seen in FIG. 50, module 521 may have a D-subminiature nine pin connector 534 and a further connector 535 which may for example be specifically designed to receive a charger connector of a battery charging unit.

In FIGS. 45–47, the hand-held terminal part 512 may further comprise a radio module 540 having an antenna 541 and a fifteen pin D-subminiature connector 542 which is a part of an end cap 543. Module 540 provides a downwardly protruding shoulder portion 549 for engaging the user's hand at one end of grip conforming configuration 522.

Figure 48:
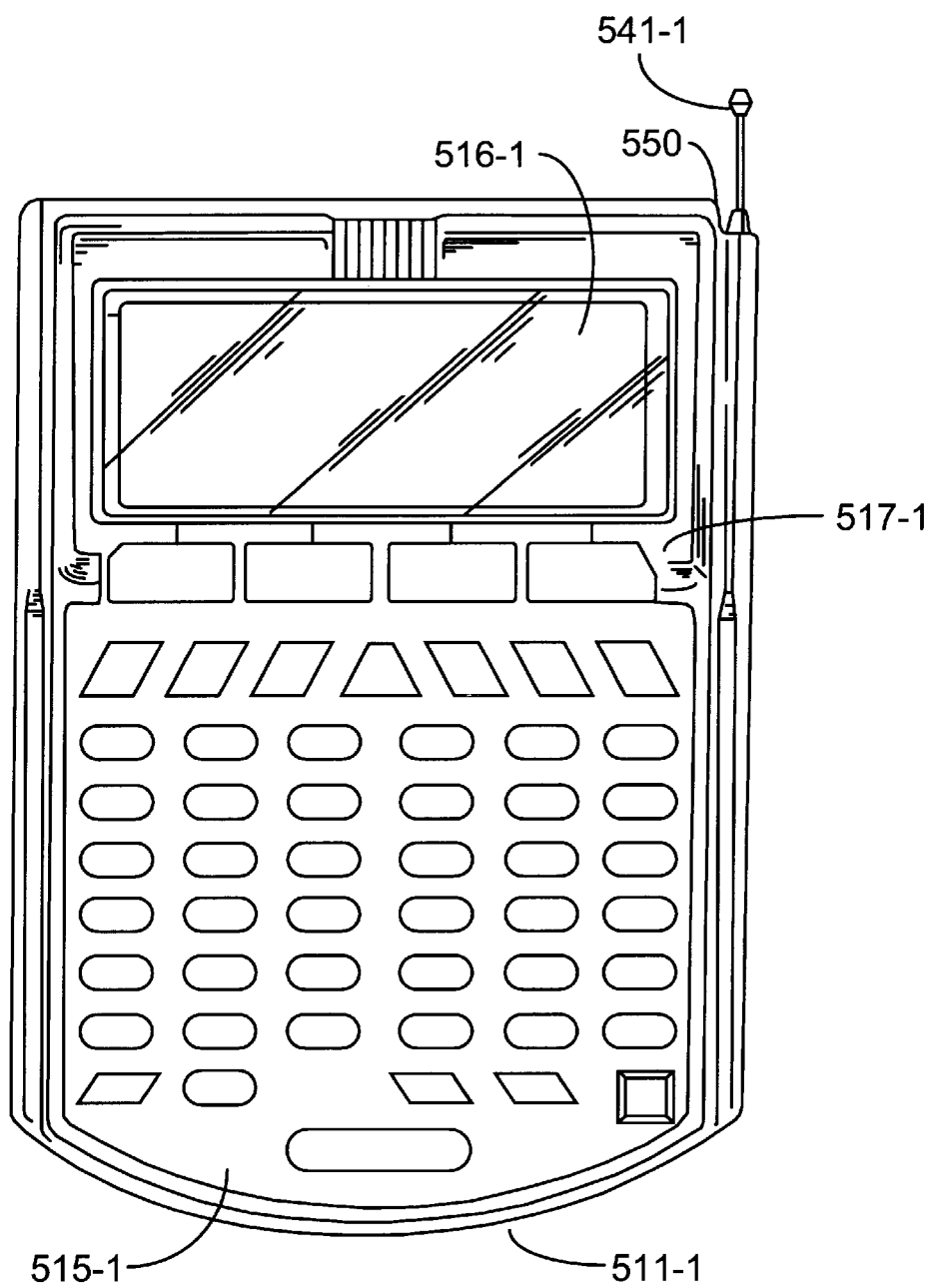
FIGS. 48, 49 and 50 are somewhat diagrammatic plan, side and end views wherein the user interface module of FIGS. 45–47 has been replaced by a much wider version, also illustrating the case where a peripheral module may provide a forwardly directed automatic reader as well as an RF communications link.
Figure 49:
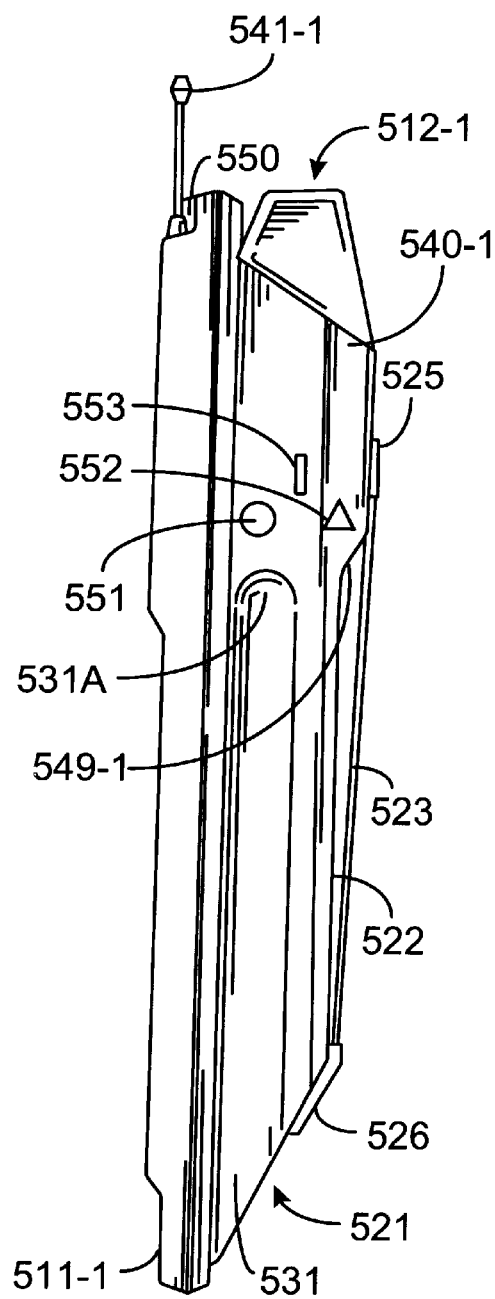

FIGS. 48, 49 and 50 illustrate the case where the user interface terminal portion or module 511 of FIGS. 45–47 has been replaced by a substantially wider user interface module 511-1 which is readily attached to the hand-held terminal part 512, FIG. 46, or to the similar hand-held terminal part 512-1 of FIGS. 49 and 50. It will be appreciated that components 515-1, 516-1 and 517-1 of FIG. 48 generally correspond with parts 515, 516 and 517 of FIG. 45, except for differences in size, spacing and arrangement. Module 511-1 is shown as having a protected recess area 550 for accommodating an antenna 541-1 which can be retracted as shown in FIG. 49 so as to be substantially fully protected by the surrounding walls of module 511-1.

FIG. 49 shows the case where the hand-held terminal part 512-1 comprises a peripheral module 540-1 which may include both a wireless communication unit such as a radio transceiver and also an automatic indicia reader unit such as the optical type of full image automatic reader unit as previously described. Module 540-1 is shown as having manually actuatable selectors 551, 552 and 553, preferably of different geometric shape and arranged for actuation by the hand engaging the module 512-1 at 522, 549-1. As shown in FIG. 47, there is preferably a corresponding set of selectors such as 561, 562 on the opposite side of module 540-1, so that the selectors are conveniently actuatable by whichever hand is gripping hand grip portion 522. The strap 523 stabilizes the support of the data terminal during manual actuation of selectors such as 551-553. The peripheral module 540-1 may have an optical reader window for effecting reading of a complete line or multiple complete lines of indicia such as bar code symbols.

Figure 51:
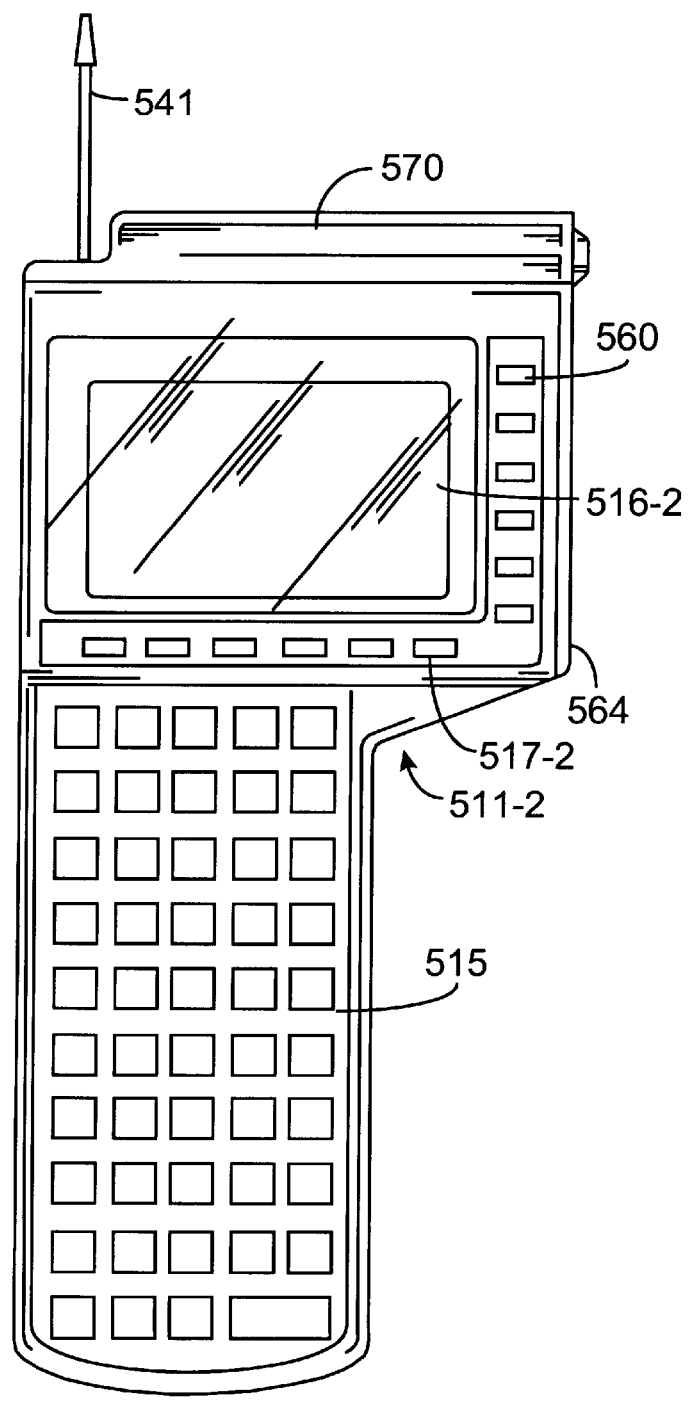
FIGS. 51, 52 and 53 are somewhat diagrammatic plan, side elevational, and end views wherein the user interface module is of intermediate size and wherein a compact automatic reader scans along a horizontal path when the long axis of the terminal is disposed vertically.
Figure 52:
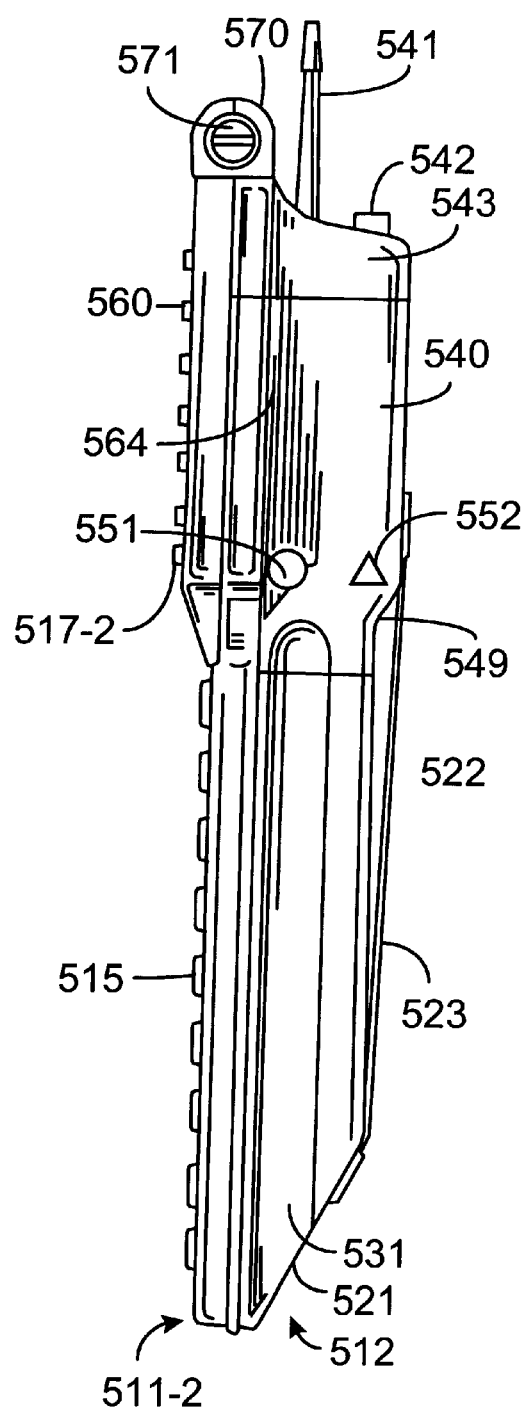
Figure 53:
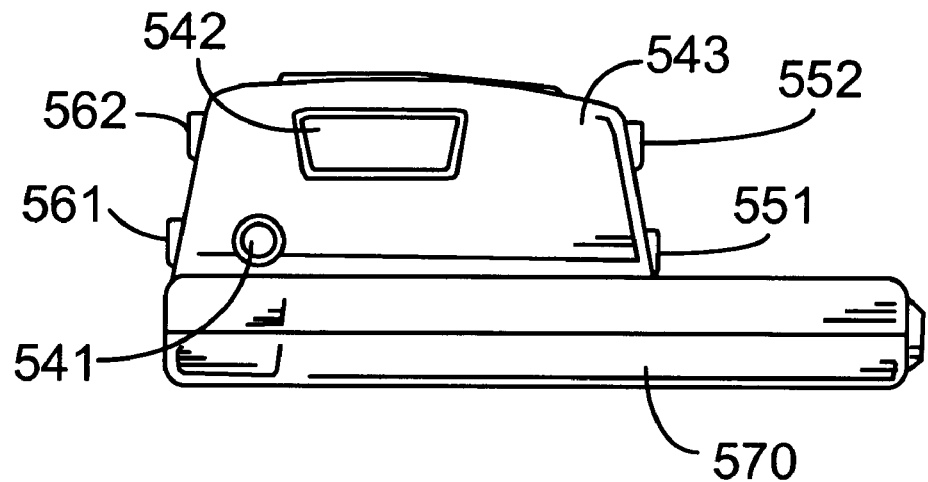

FIGS. 51–53 show a different configuration of user interface module 511-2 applied to hand-held terminal part 512 which may correspond identically to that of FIGS. 45–47.

The user interface module 511-2 may have a main keyboard 515 corresponding identically to that of FIG. 45, for example. The width of display 516-2 may however be intermediate the widths of displays 516 and 516-1. In addition to the special keys 517-2 along the lower margin of display 516-2, there is additionally a set of manually actuatable selectors 560 along the vertical or Y axis of display 516-2 for example at the right margin. The arrangement of keys 560 facilitates providing software labels for these keys by means of the adjacent portions of the display 516-2, where desired. Where the left hand is engaged with the hand grip portion 522, the strap 523 facilitates the use of the fingers of the left hand to support overhanging portion 564 of the module 511-2 during manual actuation of the keys 560.

The module 511-2 is indicated as including an automatic full line image reader unit 570 which may include an optical window as indicated at 571 which is directed transversely to the longitudinal axis of the data terminal. With this type of automatic reader, the data terminal is held edgewise during an automatic reading operation, and then may be turned through about ninety degrees about its longitudinal axis so as to place the user module 511-2 into its normal orientation for user actuation of the keys and for user observation of the display 516-2.

Figure 54:
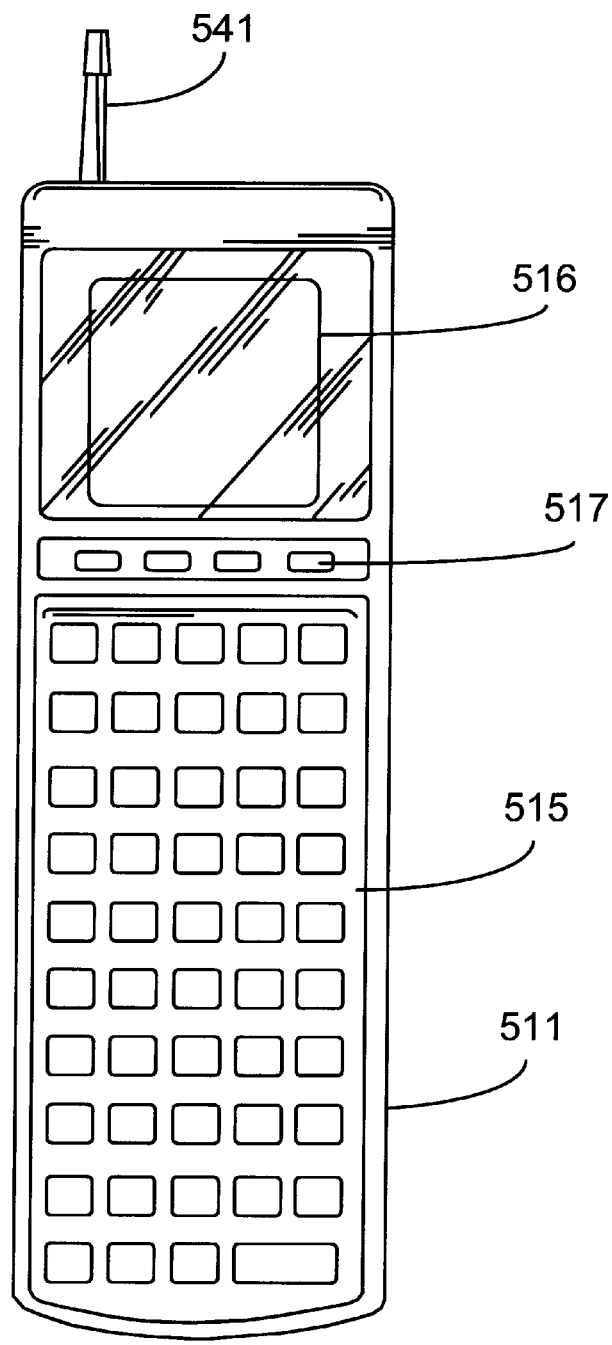
FIGS. 54, 55 and 56 are somewhat diagrammatic plan, side and end views wherein the terminal corresponds with that of FIGS. 45–47 except that a peripheral module is designed to accommodate a conventional rotary prism laser scanner.
Figure 55:
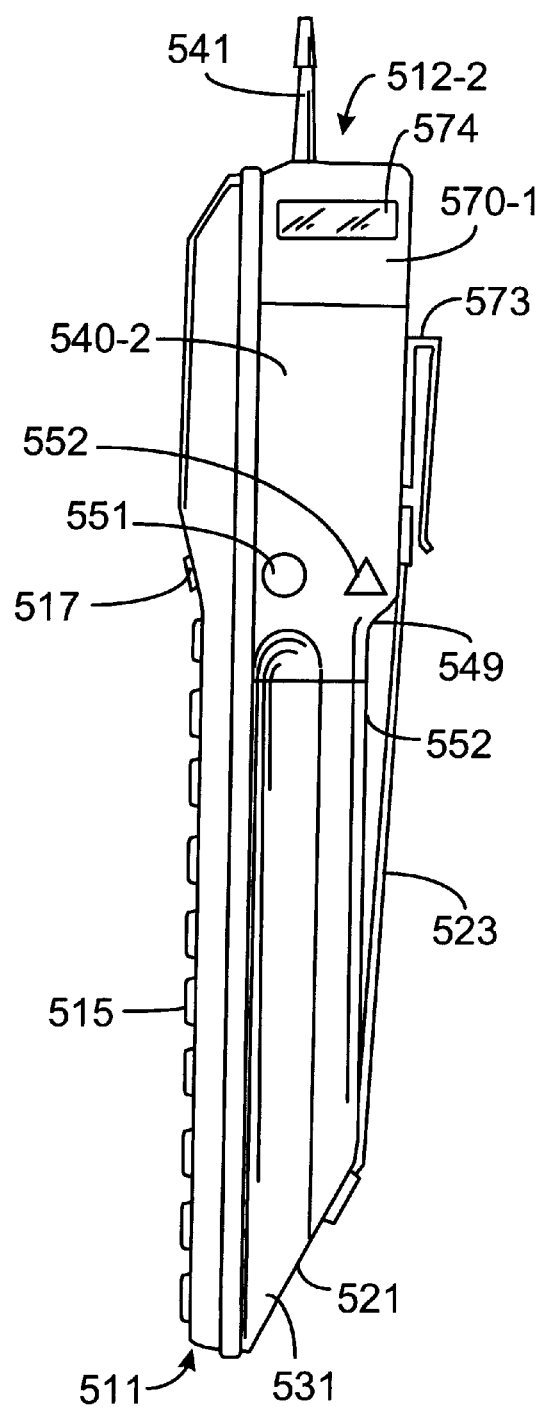
Figure 56:
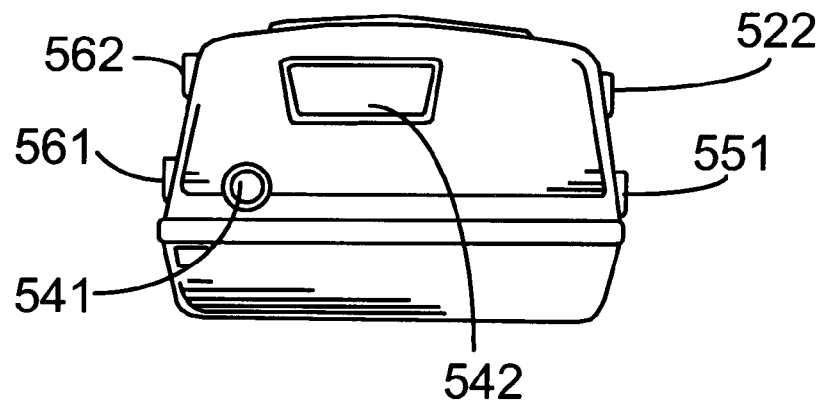

In FIGS. 54–56, modules 511 and 521 may be identical to those described with respect to FIGS. 45–47, for example. Module 540-2 may generally correspond with module 540 except that an automatic reader unit 570-1 is applied as an end cap to module 540-2 in place of end cap 543, FIG. 46. Module 540-2 is shown as having a swivel type belt clip 573 so that the data terminal can be conveniently supported from a belt or the like worn by the user. The automatic reader unit 570-1 may contain an optical window at 574 and may be of configuration so that the data terminal is to be held generally edgewise during an automatic reading operation and then turned through ninety degrees about its longitudinal axis to place the keyboard 515 and display 516 in the optimum orientation for user interaction therewith. By way of example, the optical window 574 may be rectangular and have its long axis substantially parallel to the complete lines of bar code indicia to be read by the automatic reader unit 570-1.

An automatic reader such as 570, FIG. 51, may be operable as part of module 511, 511-1 or 511-2, from battery power within this module or from handle module 521, in the absence of any peripheral module such as 540, 540-1 or 540-2. A wireless communication unit connected with antenna 541-1 may be associated with such a single module or two module system. Alternatively, the interface module or the handle module could contain extensive memory, facilitating batch operation of the one or two module systems.

The hand-held terminal parts 512, 512-1, 512-2 may also operate entirely separate from the user interface terminal module 511, 511-1, 511-2. For example the peripheral module 540, 540-1, 540-2 is already shown as containing manually actuatable selectors such as 551-553, 561, 562, which may act as manual data input/function selector means. Additional user interface means may include use of marker beams of the automatic reader unit which may flash distinctively or in different colors to signal a good or bad read. A sound generator may generate various tone patterns to communicate with the user as to mode selected, good read, etc. Further, modules 540, 540-1, 540-2 may contain voice recognition and/or voice synthesis devices to facilitate user supervision of the terminal parts 512, 512-1, 512-2. Such voice input/output interface means may be located on the side face of module 540, 540-1, 540-2 opposite the reader optical window such as 571 or 574, so that the orientation of the terminal part during automatic reading is essentially identical to the normal orientation which is optimum for user interaction with the voice recognition input and with the voice synthesis output of the module. That is the input microphone and output loudspeaker would be directed toward the user, while the optical window such as 571 or 574 would be directed away from the user, the longitudinal axis being generally vertical, and the juncture plane generally bisecting the user, and being generally at right angles to the plane of a label being read.

Modules such as 511, 511-1, 511-2 when self-powered, may be construed so that their coupling means (e.g. acoustic, infrared, inductive, etc.) are operable e.g. directly across the juncture plane 513 in the full data terminal configuration, and also at various distances from the hand-held terminal part 512, 512-1, 512-2. Such an arrangement is advantageous where the interface part 511, 511-1, 511-2 can be conveniently mounted on a goods transport device while the user may leave the transport device to actually handle products being collected or put away. With the strap 523, the part 512, 512-1, 512-2 can be carried at the wrist or forearm with both hands free when needed. The module 511, 511-1, 511-2 can display a put away list of items and locations, or a pick list of goods to be collected and locations thereof, and be referred to when the operator returns to the transport device.

The grooves 531, 532 may facilitate mounting the complete data terminal or terminal part 512, 512-1, 512-2 in a holder which may provide two ribs designed to engage in the respective grooves, and to rest against the end walls 513A, 532A at the upper ends of the grooves. The hand strap 523 may be compressed toward hand grip 522 as the part 512, 512-1, 512-2 is lowered into such a holder e.g. where the holder is affixed to a belt on the user's waist. The different width modules 511, 511-1, 511-2 are not a problem (as they would be with an enclosing holster type carrier).

A docking system for receiving terminal part 512, 512-1, 512-2 for recharging of batteries, and data uploading to a host and/or data or program downloading to the terminal may similarly have ribs designed to engage in the respective grooves 531, 532.

It is also conceivable to provide the user interface terminal module 511, 511-1, 511-2 with blind undercut slots or blind keyhole type slots for receiving the hooks 525, 526 or other end fittings of a resilient hand strap 523 when module 511, 511-1, 511-2 is separate from part 512, 512-1, 512-2. In this way, the module 511, 511-1, 511-2 may be worn on one wrist or forearm so as to face the user, while the terminal part 512, 512-1, 512-2 is worn on the other wrist or forearm in a disposition where an automatic reader such as 570 or 571-1 is ready for use. Again both hands can be available for the safe lifting of relatively heavy items to be stored, collected or transferred. A voice recognition unit may conveniently control automatic reading operation and/or the reader may have a pulsed proximity detector for measuring distance and for automatically effecting a reading operation when a label is within the operative reading range. Pulsed marker beams can be used to assist the user in keeping the label within the field of view once the distance measurement system is enabled until a valid reading has been obtained.

With automatic reader units such as 570 and 570-1 which are directed laterally, it may be desirable to accommodate users who would desire to hold part 512, 512-2 with the right hand and actuate selectors 515, 517-2, 560 with the left hand. To this end, module 511-2 could be replaced with a module where window 571 was directed laterally to the left (as the user interface is to be viewed in FIG. 51), and overhang 564 and keys 560 were laterally to the left of part 512.

In an arrangement such as indicated in FIG. 55, module 540-2 could be replaced with a module having a reader optical window directed in the opposite lateral direction from window 574, and e.g. an antenna on the opposite lateral side of the module from antenna 541, FIG. 56.

Figure 57:
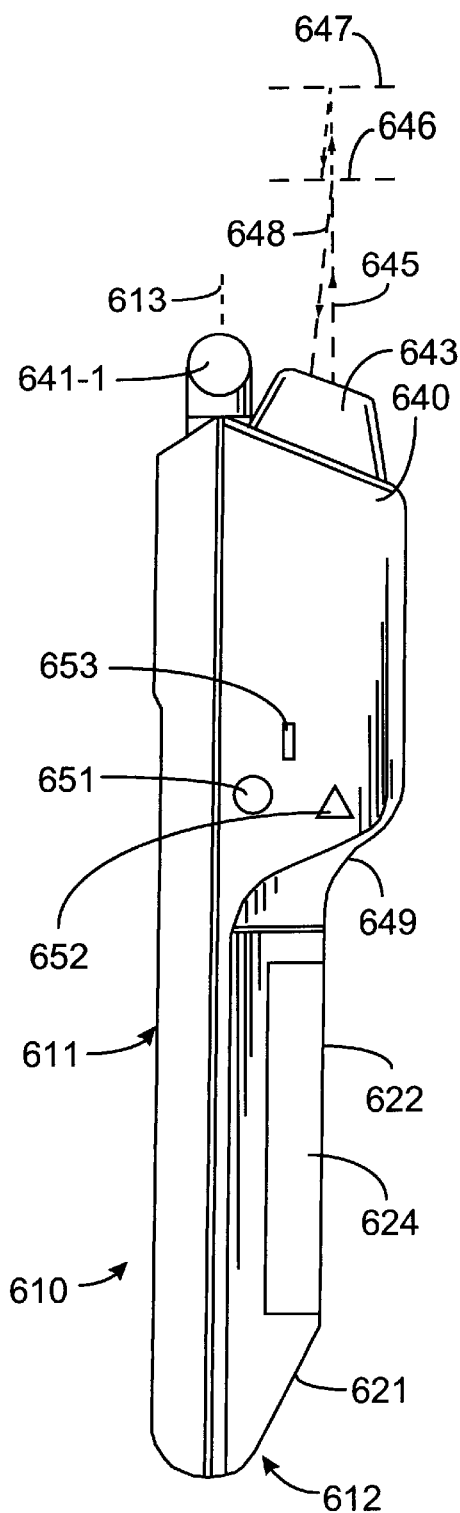
FIGS. 57–60 are side elevational, plan and opposite end views of a further modular terminal configuration in accordance with the present invention.
Figure 58:
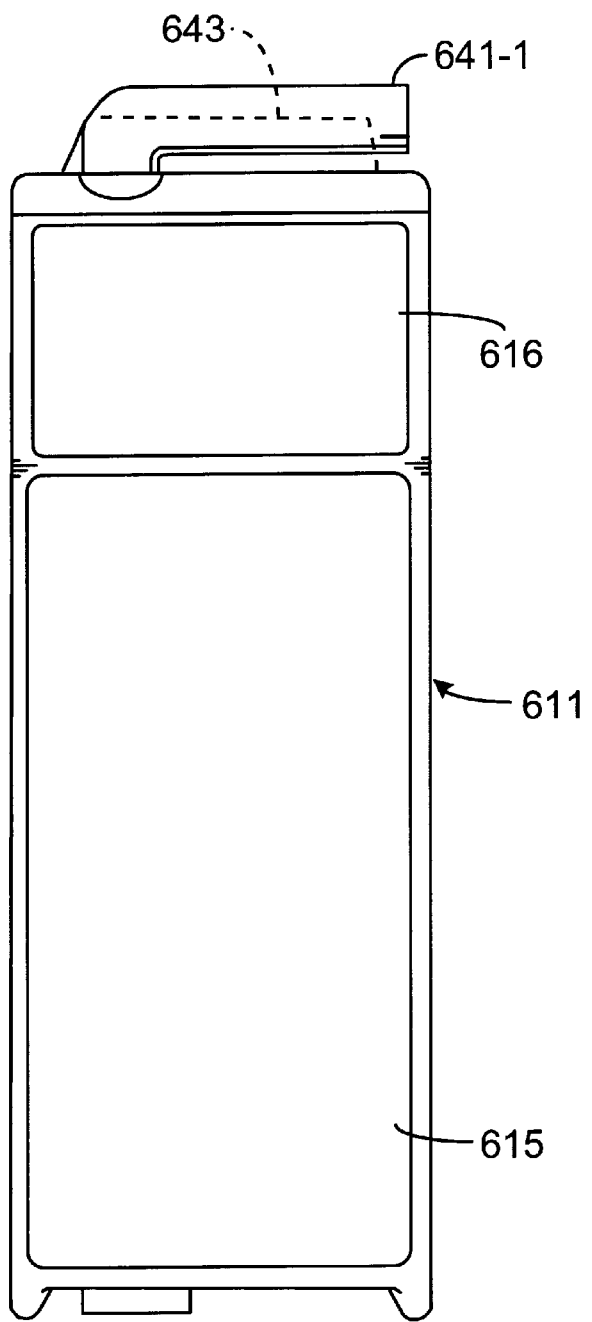
Figure 59:
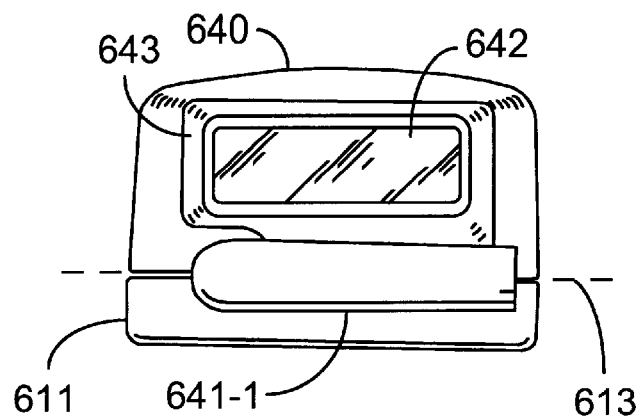
Figure 60:
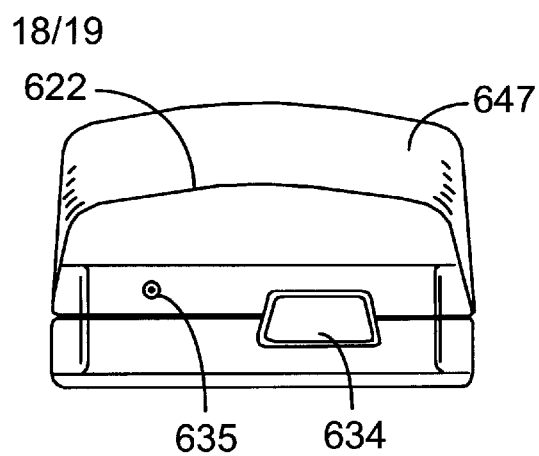

As a further alternative, antenna 541, FIG. 56, could be rearranged as described with reference to FIG. 57, and as shown at 741, 742 or 741-1, FIGS. 57, 59, to permit end cap 570-1 to form a separate module which may engage with module 540-2 in either of two opposite orientations, one as shown in FIG. 55, and the other with optical window 574 directed in an opposite sense. The module 570-1 may contain its own battery, decoder and communication interface for serial communications of decoded bar code data signals over a central optical interface channel which is aligned with a cooperating optical channel of module 540-2 in either orientation of module 570-1.

In another conceivable embodiment, a base section of a reader module e.g. containing batteries, decoder and communications interface could plug into a connector such as 542, carried by a peripheral module at 540-2. The reader module base would occupy the space of reader unit 570-1 prior to window 574. The reversible part of the reader module would e.g. have a coiled cable secured with the base section so as to accommodate either of the opposite orientations of the window of the reversible part of the reader module.

Any of the terminals or terminal parts with automatic reader modules could be clipped to the user's belt and used as hands free readers. A clip such as 573, FIG. 55, could mount terminals such as shown in FIGS. 52 and 55, with the longitudinal axis vertical, and could mount module 313 (without handle 314 or modules 311, 312) with the juncture plane vertical and the longitudinal axis horizontal. Similarly, a belt clip such as 573 or two such clips could mount terminal 610, FIG. 57, with its juncture plane 613 vertical, so that reading axis 645 would be directed toward a work area in front of the user. An angularly adjustable extension such as described for extension 326 could adjust the field of view to conveniently impinge on the work area.

Pulsed marker beams would facilitate the user's positioning of successive items, and distinctive sounds, marker beam flashes or colors, etc. could signal a successful read of each successive item. As previously mentioned the reader module could operate in a proximity detect mode. The data terminal could emit a distinctive sound whenever a label came within the field of view and within an appropriate range of distances, and actual reading would take place automatically (during an interval when all marker beams were off). The marker beams could be pulsed automatically only when an acoustic proximity detector sensed that a label was in alignment with the field of view, so as to conserve battery energy during such hands free operation of the reader unit, if desired.

Any of the displays herein may be capable of presenting any arbitrary graphical display, e.g. individual handwritten signatures, so that a person's signature can be compared with an authorized signature stored in the data terminal and displayed on the terminal display.

Furthermore the displays herein may incorporate high resolution digitizers. Where the digitizer is transparent, the digitizer field may be superimposed over the display layers. Signatures may be captured on a stroke sequence basis for dynamic comparison with a stored authentic signature. Pressure variations may also be stored and compared. See for example U.S. Pat. No. 4,793,810 issued Dec. 27, 1988, and U.S. Pat. No. 4,798,919 issued Jan. 17, 1989.

A combined digitizer/display is shown for example in U.S. Pat. No. 3,764,813 issued Oct. 9, 1973. This digitizer avoids the use of touch wires which would tend to obstruct the displayed information. It is apparent that a square digitizer/display, for example, may use angularly swept light beams e.g. at the four corners each sweeping the digitizer area. By using a square array of photosensors for following the successive sweeps, the stylus location could be accurately tracked. With multiple layers of photosensors, stylus pressure could also be recorded. Stepping motors, for example, could be used to sweep the light sources through ninety degrees clockwise during one scan, and then through ninety degrees counterclockwise for the next scan at each corner. Each laser source may be pulsed on and off after each step of its stepping motor, and the stepping actions of the respective motors may be sequentially offset to minimize the interval between pulsing of the successive laser sources. Arrays of photodetectors along the sides of the digitizer area could have single outputs since the pulsing of the laser sources would indicate the time when the absence of an output pulse represented a beam obstructed by the stylus. The production of rectangular cross section beams of good resolution over a substantial working distance and the cyclical deflection of such beams are familiar to those in the filed of laser bar code scanners, so that two or more laser sources would be sufficient for sensing both area position and contact pressure.

The user interface means of any of the embodiments herein or replacement user interface modules may provide for handwritten printing or cursive data input including provision for signature capture and verification.

The optical full image automatic reader units disclosed herein or provided by replacement modules may have resolution to capture automatically a complete signature written on a delivery receipt or the like for digital storage and automatic validation based on a digitally stored authentic signature.

Where the marker beams are only active when an acoustic range finder signals that a target is within range and generally in the field of view, a central aiming visible light beam may be pulsed whenever the acoustic range finder is active, to facilitate aiming of the optical reader. When the target is within range, the aiming light beam is de-activated to save battery power, and flashing of the marker beams begins to facilitate bringing the multiple lines of indicia into the area field of view. The marker beams may diverge according to the increasing size of the field of view with increasing distance to more precisely delineate the field of view.

The aiming visible light beam is also useful with directional type RF-tag systems, e.g. systems operating at relatively high frequencies. The flashing of the aiming light may be terminated automatically as soon as a valid reading has been obtained.

With signature verification, and also with bar code reading of bar codes at random angles, the digital image obtained can be displayed on a display of the terminal along with a normalization line. The operator can rotate the normalization line with a manual control to indicate any pronounced slant of the signature or to indicate the angle of a single or multiple bar code stored image. The processing program can rotate the stored image, and display the normalized signature or bar code image prior to validation processing or decoding.

A bar code image can automatically be normalized before decoding for example, by detecting linear segments of memory cells which all represent dark pixels, and thereby establishing the slope of the bars of the bar code. Such an algorithm can be designed to quickly locate a dark bar as a first step. For example, a digital memory may contain a bar code image representing a bar code three centimeters long by 1.7 centimeters tall, and within an area field of view four centimeters by four centimeters. By exploring horizontal lines of memory cells at one centimeter intervals and then exploring vertical lines of memory cells at one centimeter intervals, a given line of memory cells could be identified with the largest number of black pixels, (e.g. each assigned a value of one). By selecting a sequence of black cells along the selected line, and exploring memory cells on each side of the selected line, the probable slope of a given black bar could be quickly ascertained. A check would be to examine a set of memory cells along a line at right angles to the probable slope of the bars. If such a line encountered the proper number of bars, the digital image could be rotated according to the probable slope value. A refinement would be to select a sequence of black cells along the selected line closest to the minimum bar width since the slope of a minimum width bar Is more accurately determined in a minimum of steps. Once the bars were approximately vertical in memory, spaced horizontal lines of memory cells could be examined, and further rotational correction could be effected if desired.

If several spaced lines of memory cells did not render the same bar code number, once the bar code image was normalized, the image could be discarded, and a further image examined. Voice synthesis means could instruct the user to aim the automatic reader up or down, left or right, if the bar code image was found to be only partly registered in image memory.

Figure 53A:
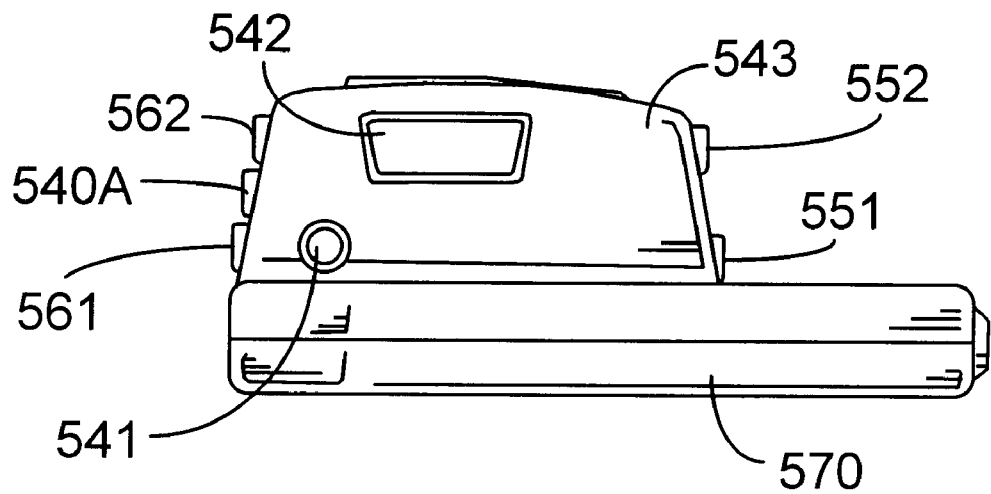
FIG. 53A is an end view corresponding to FIG. 53, but diagrammatically indicating the presence of a microphone and loudspeaker interface which is directed toward the user, while the optical window is directed away from the user, during automatic reading.
Figure 56A:
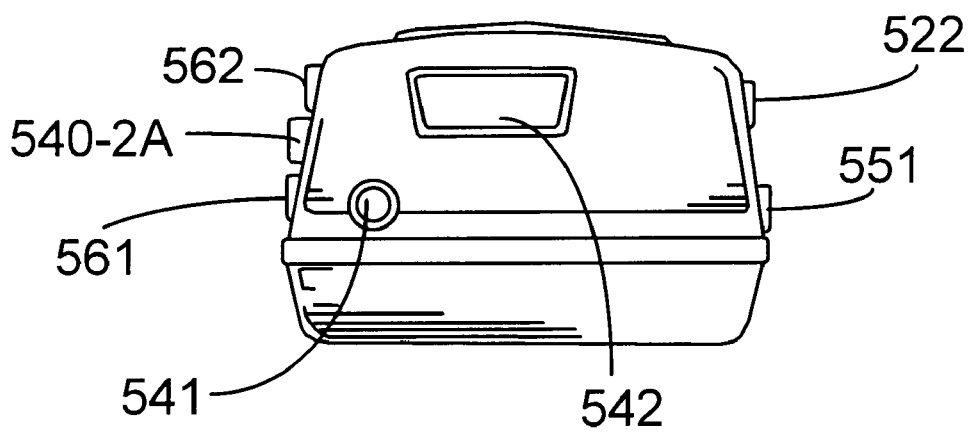
FIG. 56A is an end view corresponding to FIG. 56, but diagrammatically indicating the presence of a microphone and loudspeaker interface which is directed toward the user, while the optical window is directed away from the user, during automatic reading.

Detailed Description of FIGS. 53a and 56a

Referring to FIGS. 52, 53A, 49, 55 and 56A, voice input/output interface means such as indicated 540A, FIG. 53A, and 540-2A, FIG. 56A, may be located on the side face of module 540 (FIG. 52), 540-1 (FIG. 48), 540-2 (FIG. 55), opposite the reader optical window such as 571 (FIG. 52) or 574 (FIG. 55), so that the orientation of the terminal part during automatic reading is essentially identical to the normal which is optimum for user interaction with the voice recognition input and with the voice synthesis output of the module. That is the input microphone and output loudspeaker would be directed toward the user as indicated at 540A, FIG. 53A, and at 540-2A, FIG. 56A, while the optical window such as 571, FIG. 52, or 574, FIG. 55, would be directed away from the user, the longitudinal axis being generally vertical, and the juncture plane generally bisecting the user, and being generally at right angles to the plane of a label being read.

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

We claim:

1. A portable data capture terminal, comprising:
   (a) an automatic reader for capturing data located externally of the portable data capture terminal,
   (b) a voice interface for input of information from an operator into the portable data capture terminal,
   (c) said voice interface being located on the portable data capture terminal such that said voice interface is directed toward the operator when the portable data capture terminal is positioned to capture data.

2. A portable data capture terminal according to claim 1 wherein said voice interface comprises a microphone for input of voice information by the operator.

3. A portable data capture terminal according to claim 1 wherein said automatic reader is located on a first side of the portable data capture terminal and wherein said voice interface is located on a second side of the portable data terminal, said first side being a side of the portable data capture terminal that is opposite said second side.

4. A portable data capture terminal according to claim 1 wherein said automatic reader includes a CCD image sensor array.

5. A portable data capture terminal according to claim 1 further comprising a display.

6. A portable data capture terminal according to claim 1 further comprising a digitizer.

7. A portable data capture terminal according to claim 1 further comprising a radio frequency communication system.

8. A portable data capture terminal according to claim 1 wherein said automatic reader can be activated by voice commands received by said voice interface.

9. A portable data capture terminal according to claim 1 wherein a voice synthesis component is operable to provide an operator with aiming instructions for correctly aiming said automatic reader for capturing data.

10. A portable data capture terminal, comprising:
    (a) an automatic reader for capturing data externally of the portable data capture terminal,
    (b) a voice interface for input of information from an operator into the portable data capture terminal, (c) said voice interface being located on the portable data capture terminal such that said voice interface is directed toward the operator when said automatic reader is directed toward data to be captured.

11. A portable data capture terminal according to claim 10 wherein said voice interface comprises a microphone for input of voice information by the operator.

12. A portable data capture terminal according to claim 10 further comprising a voice synthesis component.

13. A portable data capture terminal according to claim 12 wherein said voice interface comprises a speaker for outputting information from said voice synthesis component to the operator.

14. A portable data capture terminal according to claim 10 wherein said automatic reader is located on a first side of the portable data capture terminal and wherein said voice interface is located on a second side of the portable data terminal, said first side being a side of the portable data capture terminal that is opposite said second side.

15. A portable data capture terminal according to claim 10 wherein said automatic reader includes a CCD image sensor array.

16. A portable data capture terminal according to claim 10 further comprising a display.

17. A portable data capture terminal according to claim 10 further comprising a digitizer.

18. A portable data capture terminal according to claim 10 wherein said automatic reader can be activated by voice commands received by said voice interface.

19. A portable data capture terminal according to claim 12 wherein said voice synthesis component is operable to provide an operator with aiming instructions for correctly aiming said automatic reader for capturing data.

20. A portable data capture terminal according to claim 10 wherein said voice interface is capable of accepting voice input to control said automatic reader.

21. A portable data capture terminal according to claim 10 further comprising a wireless communication unit.

22. A portable data capture terminal according to claim 10 wherein said automatic reader is a full image automatic reader.

* * * * *